(12) United States Patent  
Cannon

(10) Patent No.: US 7,077,744 B2
(45) Date of Patent: Jul. 18, 2006

(54) COMPETITIVE, MATRIX TYPE GAME, PLAY THEREOF AS A BONUS EVENT TO A PRIMARY GAME, AND APPARATUS AND SYSTEMS FOR IMPLEMENTING THE GAME

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 263 days.

(21) Appl. No.: 10/037,446

(22) Filed: Jan. 2, 2002

(65) Prior Publication Data

US 2003/0125100 A1 Jul. 3, 2003

(51) Int. Cl.
*A63F 9/24* (2006.01)
(52) U.S. Cl. .............. 463/20; 463/16; 463/9
(58) Field of Classification Search ........... 463/9, 463/16, 20
See application file for complete search history.

(56) References Cited

U.S. PATENT DOCUMENTS

| | | | |
|---|---|---|---|
| 497,906 A * | 5/1893 | Bettini | 194/294 |
| 502,891 A * | 8/1893 | Schultze | 194/294 |
| 514,664 A * | 2/1894 | Schultze | 194/294 |
| 517,436 A * | 4/1894 | Clawson | 194/294 |
| 617,297 A * | 1/1899 | Neeley et al. | 273/244.1 |
| 1,564,746 A | 12/1925 | Barnard | |
| RE19,674 E * | 8/1935 | Mills | 194/294 |
| 2,102,532 A * | 12/1937 | Hoke, Jr. | 273/383 |
| 2,135,182 A * | 11/1938 | Joze | 273/145 R |
| 3,977,681 A | 8/1976 | Deitrich | |
| 4,651,996 A | 3/1987 | Watkins, Jr. | |
| 5,393,057 A | 2/1995 | Marnell, II | |
| 6,015,346 A | 1/2000 | Bennett | |
| 6,102,798 A | 8/2000 | Bennett | |
| 6,190,255 B1 | 2/2001 | Thomas et al. | |
| 6,309,299 B1 * | 10/2001 | Weiss | 463/20 |
| 6,315,660 B1 * | 11/2001 | DeMar et al. | 463/16 |
| 6,428,412 B1 * | 8/2002 | Anderson et al. | 463/9 |
| 6,461,241 B1 * | 10/2002 | Webb et al. | 463/20 |
| 2003/0114218 A1 | 6/2003 | McClintic | |
| 2003/0114219 A1 | 6/2003 | McClintic | |
| 2003/1009581 | 6/2003 | Cannon et al. | |

OTHER PUBLICATIONS

Fey, Slot Machines, A pictorial History of theFirst 100 years, Liberty Belle Books, 1983, pp. 78;126; 164, Pente Rules.*
http://www.ahs.uwaterloo.ca/~museum/vexhibit/board/row games/pente.html, "Row Games—Pente," pp. 1-2.
http://www.ahs.uwaterloo.ca/~museum/vexhibit/board/ rowgames/row.html, "Row or Mill Games—Morris—Linea—Tabula—Mühle," pp. 1-2.
http://www.ugateways.com/bof4.html, "Brirish Othello Federation," pp. 1-2.

* cited by examiner

*Primary Examiner*—Corbertt B. Coburn
(74) *Attorney, Agent, or Firm*—Marshall, Gerstein & Borun LLP

(57) ABSTRACT

A competitive, matrix type game includes a matrix on which game pieces of two or more gamers, one of which may be a computer, are positioned. Each gamer positions a game piece on the matrix upon receiving a turn. The game pieces of one or more other gamers may be captured when a gamer positions or repositions one of his or her game pieces at an opposite end of a linear (vertically, horizontally, or diagonally) sequence of game pieces opposite from another, like game piece belonging to that gamer. Alternatively, a capturing event may occur when a gamer positions more than two game pieces along the same line of the matrix. The game may be effected manually or electronically, and may comprise a stand-alone game or a bonus event to a primary game. Gaming machines and systems that may be used to implement play of the game are also described.

16 Claims, 21 Drawing Sheets

COMPETITIVE, MATRIX TYPE GAME, PLAY THEREOF AS A BONUS EVENT TO A PRIMARY GAME, AND APPARATUS AND SYSTEMS FOR IMPLEMENTING THE GAME

BACKGROUND OF THE INVENTION

1. Field of the Invention

The present invention relates generally to competitive, matrix type games and, more specifically, to the use of matrix type games in gaming systems. The present invention also relates to gaming systems that include primary games with bonus play in the form of multiple player matrix type games.

2. Background of Related Art

Matrix type games, including matrix type games that require a player to strategize, are known.

One example of such a game is OTHELLO, a two player game in which game disks that are one color, such as white, on one side and another color, such as black, on the other side are used. Game play begins with two disks for each player, each disk displaying the player's game play color (e.g., two black and two white), positioned in two-by-two arrangement in the four central spaces of the game matrix, with disks that appear white being located in the upper left and lower right spaces and disks that appear black being located in the upper right and lower left spaces. Turns occur in a sequential fashion, with black taking the first turn. Upon receiving a turn, a player places a disk with his or her corresponding game play color (e.g., black) at a space of the matrix in such a way as to capture at least one of the opponent's disks (e.g., one or more disks that appear white) in-line between the just-positioned disk and a disk of the same color. The disks that are captured in such a manner are then flipped to change the color thereof from the opponent's game play color to the game play color of the capturing player. When one or more disks are flipped, additional disks may not be captured. If a player cannot position a disk on the matrix in such a way as to capture one or more of his or her opponent's disks, the player skips one or more turns until a capturing opportunity arises. Game play continues until neither player can capture any of the previously positioned or flipped disks belonging to the other or until no spaces remain on the matrix. The players then tally the disks that show their corresponding colors, with the player whose color appears most often on disks that have been positioned on the matrix winning the game.

PENTE is another example of a matrix type game of skill. In PENTE, a player may win upon positioning five game pieces in sequentially adjacent, linear arrangement, or "five in a row". Alternatively, a player may win by capturing ten of another player's game pieces. Game pieces may be captured, two at a time, by positioning two of one player's game pieces, in-line, at opposite ends of two of an opposing player's game pieces.

Gaming systems that include multiple gaming stations that communicate with one another or with a common controller, or server, are well known in the art. Such communication may be conducted to effect play of a primary game or a secondary game, in which the play of one gamer is in some way tied to the play of one or more other gamers. As an example, the play of multiple gamers at multiple, communicating gaming stations may be tied in playing black jack or poker by providing cards to each of the gamers from a common set (i.e., from the same "dealer").

Competitive, or linked, play in bonus games is also known. For example, upon the occurrence of one or more predetermined events in a primary game, or by achieving a particular outcome in a primary game, a gamer may be awarded a "turn" in a bonus game that is played against one or more other gamers. An example of such tied, secondary game play is describe in U.S. Pat. No. 5,393,075, which issued to Anothony A. Marnell, II, et al. on Feb. 28, 1995 (hereinafter "Marnell"). In particular, Marnell describes a gaming apparatus in which a primary gaming apparatus and a secondary gaming apparatus are coupled to one another. The secondary gaming apparatus used by one gamer may communicate with the secondary gaming apparatus of other gamers to provide competitive game play. The exemplary secondary game described in Marnell is a bingo game, which is, of course, a game of chance.

The inventor is not aware of any gaming apparatus or systems that permit a gamer to participate in a so-called "game of skill" or "game of strategy" upon achieving a particular outcome in a primary game or upon the occurrence of one or more predetermined events during play of the primary game.

SUMMARY OF THE INVENTION

The present invention includes a competitive, matrix type game that requires each participate therein, or gamer, to strategize, as well as gaming apparatus and systems that are used to play the matrix type game. The matrix type game of the present invention may be played by a single gamer against a computer or between two or more gamers.

In playing the matrix type game of the present invention, during each turn, a gamer places a game piece, which may be readily identifiable by a particular gamer as being that gamer's game piece (e.g., by color, shape, size, identifying indicia, etc.), in a desired location (e.g., a square or intersecting lines) of a matrix. If more than two gamers are competing in the matrix type game, the game pieces of each gamer may be readily identifiable by each gamer as belonging to another, distinct gamer. Alternatively, each gamer may only be able to distinguish his or her game pieces from those of all of the other gamers collectively, which may make it more difficult for each gamer to determine the number of his or her game pieces that may be captured as another gamer positions a game piece on the matrix. A gamer is awarded upon the occurrence of one or more prespecified results, which are referred to herein as "capturing events", in the matrix type game.

For example, each gamer may attempt to "capture" the game pieces of a computer or one or more other gamers by positioning two game pieces on opposite sides of one game piece or at opposite ends of linearly arranged, sequential game piece of the computer or of one or more other gamers. Alternatively, a gamer may be required to position a predetermined number of game pieces in a linearly arranged series of game pieces before that gamer may capture the each of the sequential, linearly arranged game pieces. Upon capturing the game pieces of the computer or one or more other gamers, points may be added to the capturing gamer's score or the capturing gamer may receive an award. In addition, the capturing gamer may receive points or an award for any of the capturing gamer's game pieces that also become captured, as well as for the capturing game pieces. The captured game pieces may then be removed from the matrix, either with or without the capturing game pieces.

As another example of operation of a matrix type game incorporating teachings of the present invention, any game pieces of a computer or one or more other gamers that are captured between the pieces of a gamer are replaced with that gamer's pieces, or are "converted" or "flipped" in such a way as to have the same identity of the capturing gamer's game pieces. When such conversion occurs, additional capturing of the game pieces of the computer or one or more other gamers may automatically occur.

Yet another example of a matrix type game according to the present invention requires that more than two of a gamer's game pieces be located in a linearly arranged group of spaces to capture and/or convert the game pieces of a computer or one or more other gamers that are located in that linearly arranged group of spaces.

The amount a gamer may be awarded for capturing the game pieces of another gamer may be a prespecified amount, or may be based on an amount of game credits or money wagered by the gamer who "places" the game piece onto the matrix. Alternatively, the amount of award associated with each game piece may be associated with the result of a primary game that led to the placement of that game piece on the matrix.

A gamer may place a game piece over that of a computer or another gamer, thereby converting that game piece. The value of such a converted game piece may be that of the last-placed game piece or the additive value of each game piece that has been positioned at that particular location of the matrix.

In addition, or in the alternative, a gamer may use a turn to move a previously positioned game piece rather than position a new game piece on the matrix.

Upon capturing the game pieces of a computer or one or more other gamers in accordance with teachings of the present invention, a gamer may be provided with an option to prevent such capturing in lieu of the chance to play for a larger award by capturing a larger group of game pieces. A gamer that chooses to delay the capture of game pieces may receive an additional award for each such delay in the event that gamer subsequently captures the game pieces of the computer or another gamer along the same line of the matrix.

Gaming devices and systems incorporating teachings of the present invention may use the inventive matrix type game as a primary game or for bonus play in addition to a primary game.

The present invention also includes a gaming system in which a gamer is awarded a turn in a strategic secondary game, such as the inventive matrix type game, upon achieving a particular outcome during play of a primary game, or upon the occurrence of one or more predetermined events during play of the primary game.

When the matrix type game is provided as a bonus to a primary game played on a gaming apparatus or system, each gamer of, in the case of single-gamer play, the gamer and the computer, may be granted turns in a sequential fashion, or nonsequentially. As an example of nonsequential play of the matrix-type, in the event that two or more gamers play the matrix type game against one another, turns may be granted on the basis of the gamer's relative speeds of finishing a round of a primary game or on the occurrence of a prespecified qualifying event during play of the primary game. Play by a single gamer may follow a similar course, with the gamer receiving two or more turns in a row randomly or if play of the primary game or a qualifying event associated with the primary game is completed within a predetermined period of time.

Upon receiving a turn, a gamer may have the ability to block the computer or other gamers from taking turns for a limited period of time. If such a blocking period is available, it may be a predetermined period of time or based upon a result achieved during play of a primary game (e.g., more blocking time may be awarded for a better result in the primary game) or an amount of game credits or money paid by the gamer receiving the blocking period.

Other features and advantages of the present invention will become apparent to those of ordinary skill in the art through consideration of the ensuing description, the accompanying drawings, and the appended claims.

BRIEF DESCRIPTION OF THE DRAWINGS

In the drawings, which illustrate exemplary features of various embodiments of the present invention.

DETAILED DESCRIPTION

Figure 1:
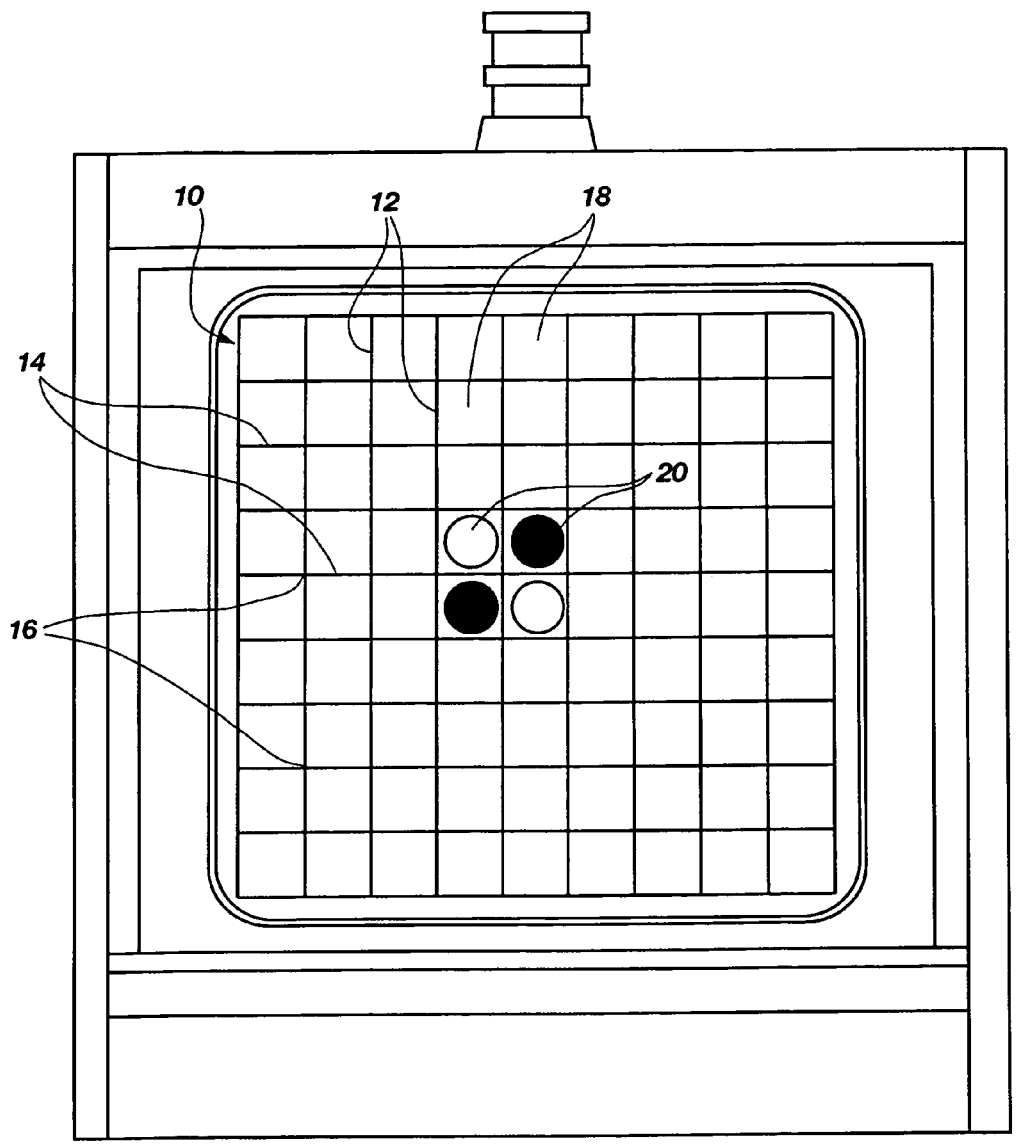
FIG. 1 schematically depicts an exemplary competitive, matrix type game that incorporates teachings of the present invention.

FIG. 1 depicts an exemplary matrix 10 in which play of a game incorporating teachings of the present invention may be effected. As depicted, matrix 10 includes a plurality of mutually parallel vertically oriented lines 12 that are spaced apart from one another. In addition, matrix 10 includes a plurality of spaced apart, mutually parallel horizontally oriented lines 14. Each horizontally oriented line 14 intersects every vertically oriented line 12 of matrix 10 at an intersection point 16. Due to the spaced apart orientations of vertically oriented lines 12 relative to one another and horizontally oriented lines 14 relative to one another, as well as the intersection relationship between vertically oriented lines 12 and horizontally oriented lines 14, matrix 10 includes spaces 18, the sizes of which are defined by portions of adjacent vertically oriented lines 12 and the tops and bottoms of which are defined by portions of adjacent horizontally oriented lines 14. In addition, the corners of each space 18 are formed by intersection points 16.

Game play in accordance with the present invention may include positioning of game pieces 20 either at intersecting points 16 of matrix 10 or in spaces 18 thereof.

Figure 2:
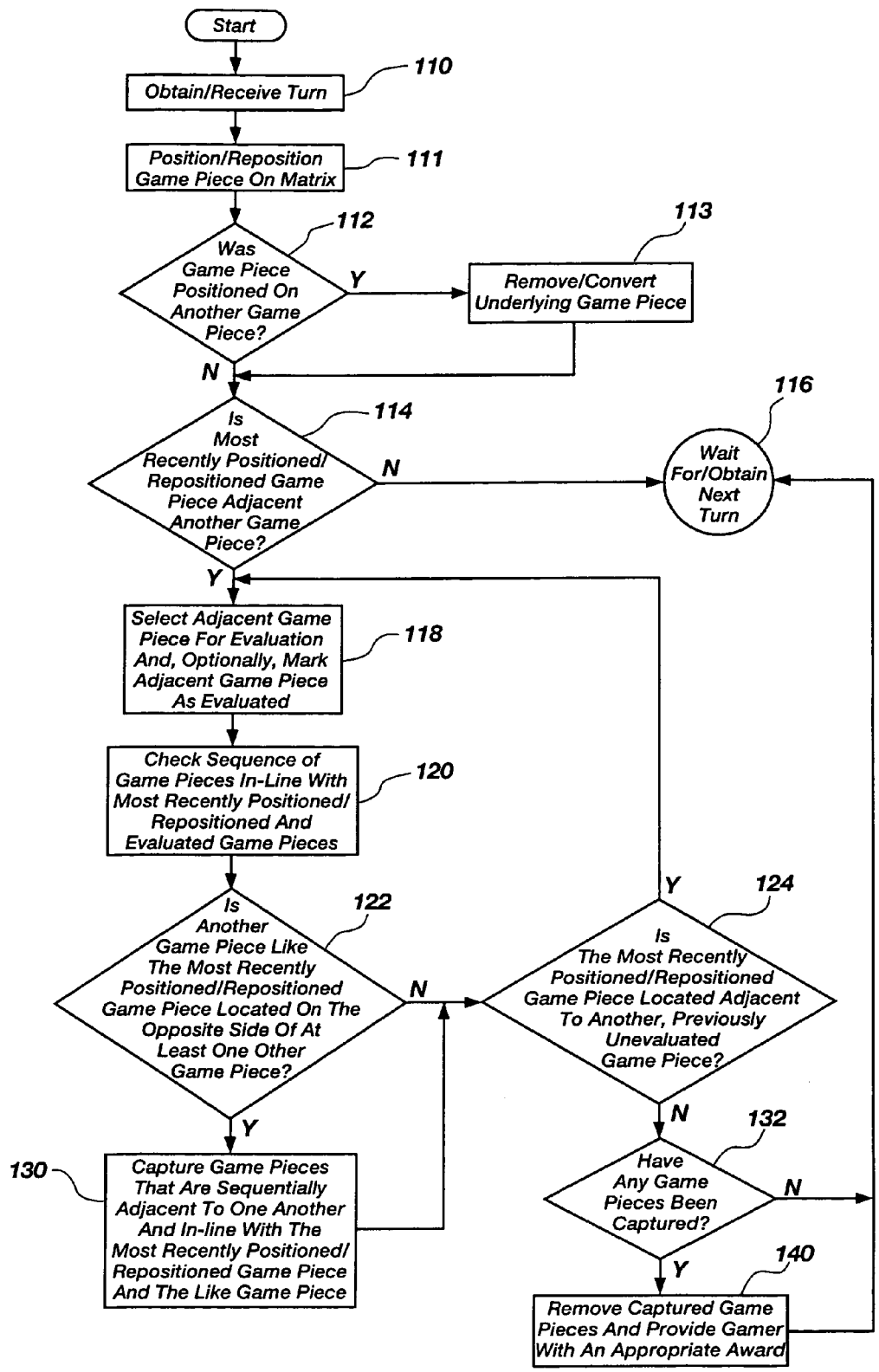
FIG. 2 is a flow chart that illustrates an exemplary method by which play of a competitive, matrix type game according to the present invention may be effected, in which a gamer attempts to capture game pieces of a computer or one or more other gamers by positioning like game pieces at opposite ends of sequentially adjacent game pieces that are arranged in-line on the matrix and captured game pieces are removed from play.

The rules of an exemplary embodiment of a competitive, matrix type game incorporating teachings of the present invention are depicted in the flow chart of FIG. 2.

At reference character 110 of FIG. 2, a gamer receives a turn in the game. The receipt of a turn may occur sequentially among the various competing players and, thus, either initially to start the game or following the previous gamer's completion of a turn. Alternatively, a turn may be received on the basis of a qualifying event, examples of which will be discussed in greater detail hereinafter. Optionally, upon the occurrence of one or more prespecified qualifying events, a gamer may be awarded an opportunity to position more than one game piece 20 on matrix 10 during a single turn.

Figure 3:
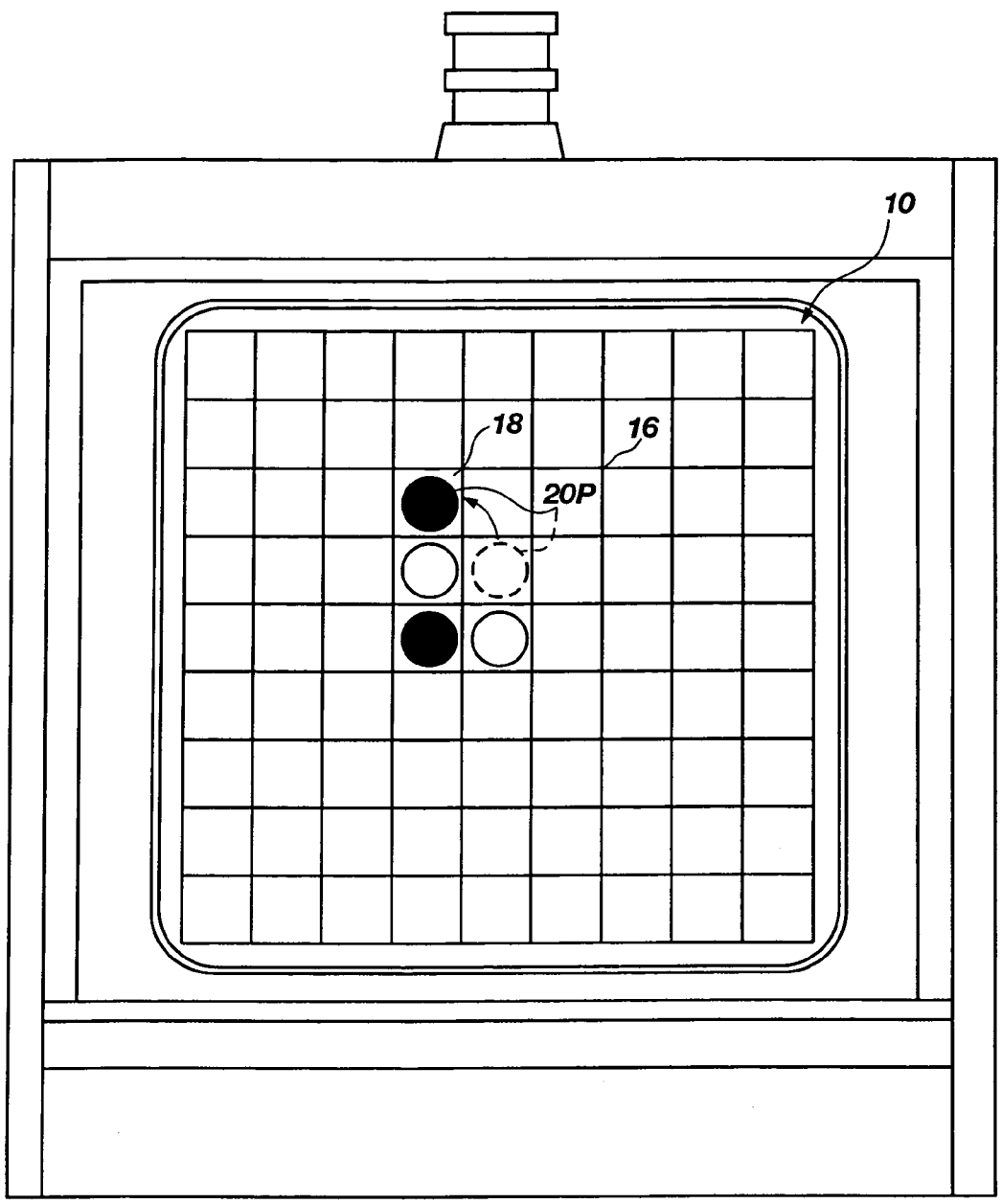
FIG. 3 depicts movement of a game piece by a gamer which was previously positioned by the gamer.

When it is a gamer's turn to participate in the game, the gamer may, at reference character 111 of FIG. 2, position a game piece 20 in a space 18 or at an intersection point 16 of matrix 10 on which play of the game is effected, as shown in FIG. 1. For the purpose of clarity, the most recently positioned game piece 20 is identified as game piece 20P. As an example, each time the gamer takes a turn, a new game piece 20 may be positioned on matrix 10. Alternatively, as shown in FIG. 3, the gamer may choose to move, or reposition, a previously positioned game piece 20P to a new position (i.e., intersecting point 16 or space 18) on matrix 10.

Figure 4:
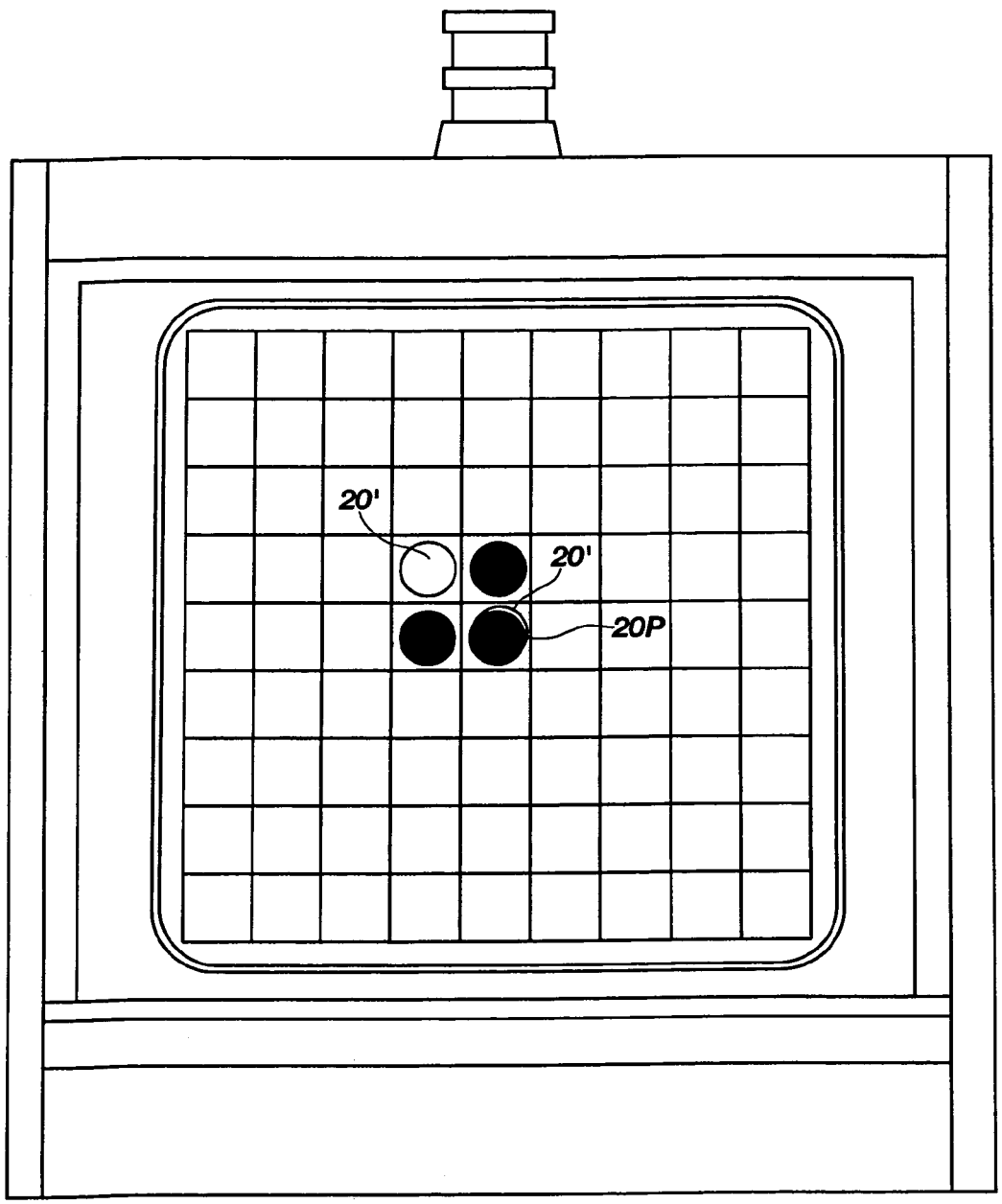
FIG. 4 depicts stacking of a gamer's game piece upon the game piece of a computer or another gamer.

Optionally, as depicted in FIG. 4, the gamer may choose to position of reposition a game piece 20P on the game piece 20' of another gamer of a computer against which the game is being played. When one game piece 20P is placed on another game piece 20', as may be determined at reference character 112 of FIG. 2, the underlying game piece 20' may be removed from play or replayed with a game piece 20 of the capturing gamer who placed game piece 20P thereover.

Figure 5:
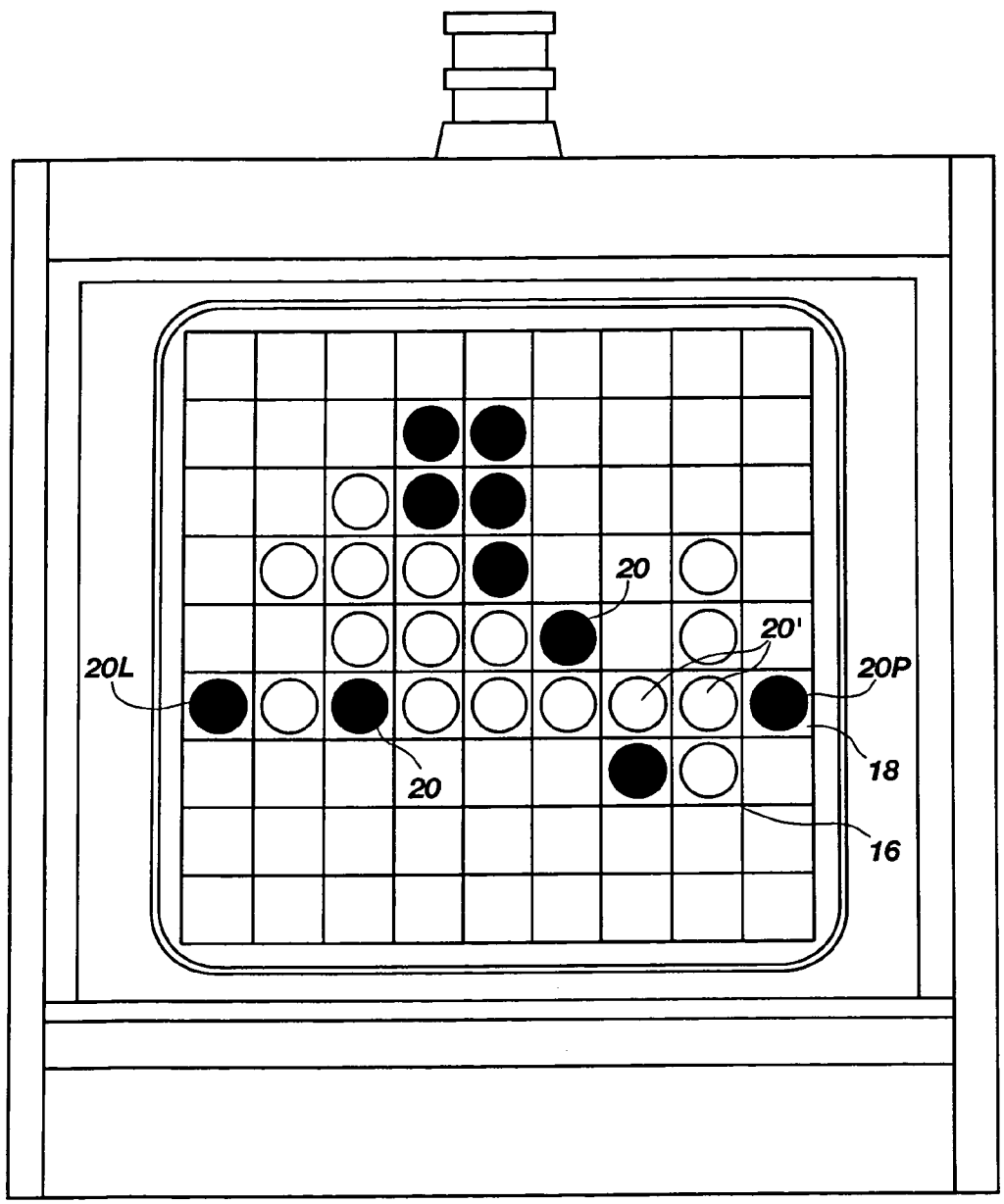
FIG. 5 illustrates an exemplary capturing configuration of game pieces in accordance with the embodiment of matrix type game depicted in the flow chart of FIG. 2.

Referring now to FIG. 5, once a game piece 20P is positioned or repositioned, process flows to reference character 114 of FIG. 2, where a determination is made as to whether or not the most recently positioned or repositioned game piece 20P has been placed at an intersecting point 16 or on a space 18 that lies adjacent to (horizontally, vertically, or diagonally) a respective intersecting point 16 or space 18 occupied by another, previously positioned game piece 20, 20'. If the most recently positioned or repositioned game piece 20P is not positioned adjacent to another game piece 20, 20', process flows to reference character 116 of FIG. 2, where the gamer is required to wait for or obtain another turn. If, however, the most recently positioned or repositioned game piece 20P is positioned adjacent to at least one other game piece 20, 20', process flows to reference character 118 of FIG. 2.

At reference character 118 of FIG. 2, a game piece 20, 20' which is located adjacent to the most recently positioned or repositioned game piece 20P is selected for evaluation and may be marked to indicate evaluation thereof. Next, at reference character 120 of FIG. 2, all of the game pieces 20, 20' that are positioned sequentially adjacent to one another (i.e., in a so-called "row") are evaluated.

If, at reference character 122 of FIG. 2, it is determined that none of the mutually adjacent game pieces 20, 20' located in the same sequence as the most recently positioned or repositioned game piece 20P is of the same type as game piece 20P, process flows to reference character 124 of FIG. 2, where a determination is made as to whether or not another, unevaluated game piece 20, 20' is positioned adjacent to the most recently positioned game piece 20P. If not, process flows to reference character 116 of FIG. 2, where the gamer is required to wait for or to obtain another turn. Otherwise, process flows back to reference character 118 of FIG. 2, where another game piece 20, 20' that lies adjacent to the most recently positioned or repositioned game piece 20P is selected for evaluation.

If, on the other hand, it is determined at reference character 122 of FIG. 2 that at least one of the sequentially adjacent, linearly arranged game pieces 20 was positioned by of "belongs to" the same gamer who positioned or repositioned game piece 20P and that at least one game piece 20' belonging to a computer or another gamer is positioned between game piece 20P and the like game piece 20L, as are shown in FIG. 5, process flows to reference character 130 of FIG. 2.

At reference character 130, each of the game pieces 20' located between the most recently positioned or repositioned game piece 20P and the like game piece 20L are identified as having been "captured". In addition to capturing the game pieces 20' of one or more other gamers, a gamer may also capture his or her own game pieces 20. Further, the capturing game pieces 20, including the most recently positioned or repositioned game piece 20P and the like game piece 20L positioned at the opposite end of the line of sequentially adjacent game pieces 20', 20, may be deemed to have been captured.

Game pieces 20', 20 may be captured along more than one line. After game pieces 20', 20 in one line have been captured, process flows to reference character 124 of FIG. 2, where an inquiry is made as to whether or not any additional, previously unevaluated game pieces 20, 20' are positioned adjacent to the most recently positioned game piece 20P. If so, process flows back to reference character 118 of FIG. 2, where another game piece 20, 20' that lies adjacent to the most recently positioned or repositioned game piece 20P is selected for evaluation. If no additional game pieces 20, 20' lie adjacent to the most recently positioned or repositioned game piece 20P, a determination is then made, at reference character 132 of FIG. 2, whether or not any game pieces 20', 20 were captured upon placement of game piece 20P.

If it is determined at reference character 132 of FIG. 2 that no game pieces 20', 20 were captured as game piece 20P was positioned or repositioned, process flows to reference character 116 of FIG. 2, where the gamer is required to wait for or to obtain another turn. If, however, one or more game pieces 20', 20 were captured when game piece 20P was positioned, process flows to reference character 140 of FIG. 2, where each captured game piece is removed from play and the gamer is provided with an appropriate award.

Figure 5A:
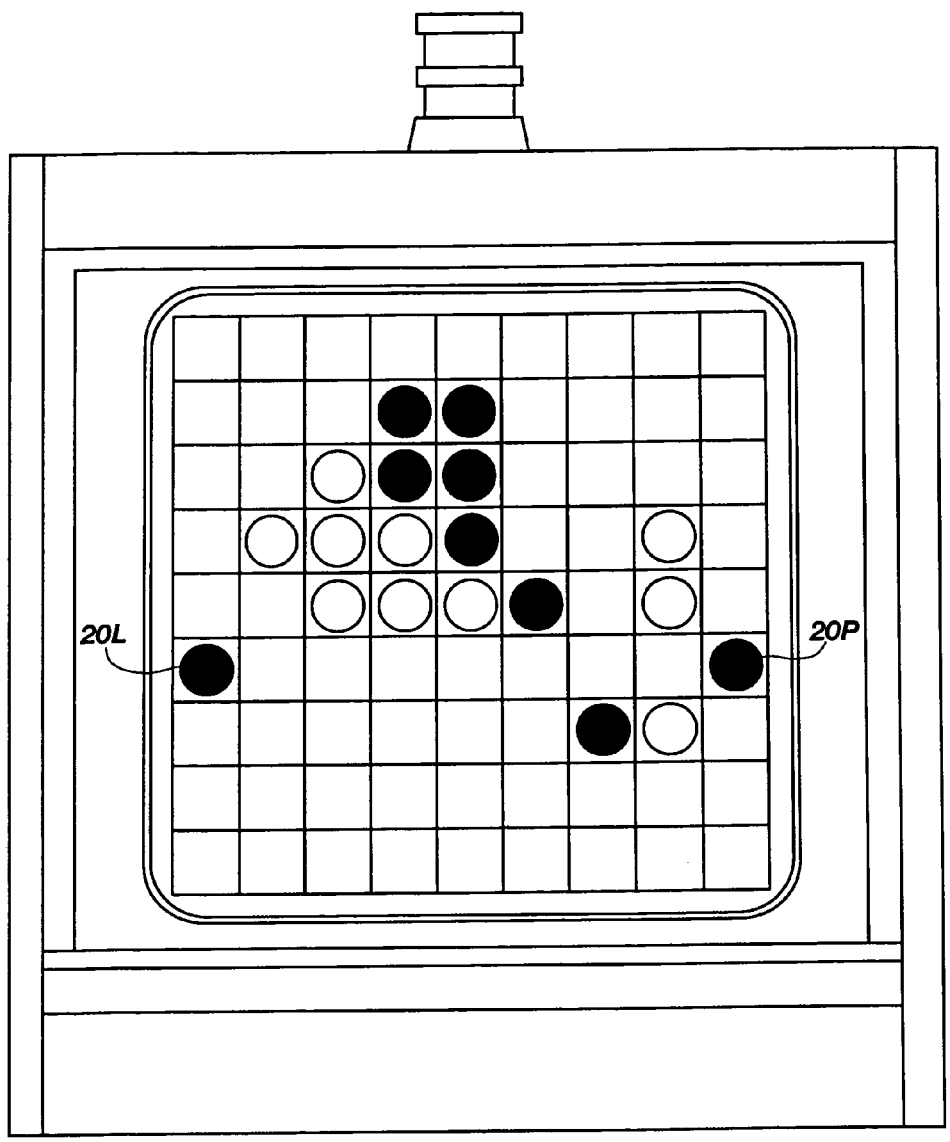
FIG. 5A shows a first possible result once a capturing configuration such as that shown in FIG. 5 has been achieved, in which only the captured game pieces are removed from the matrix.
Figure 5B:
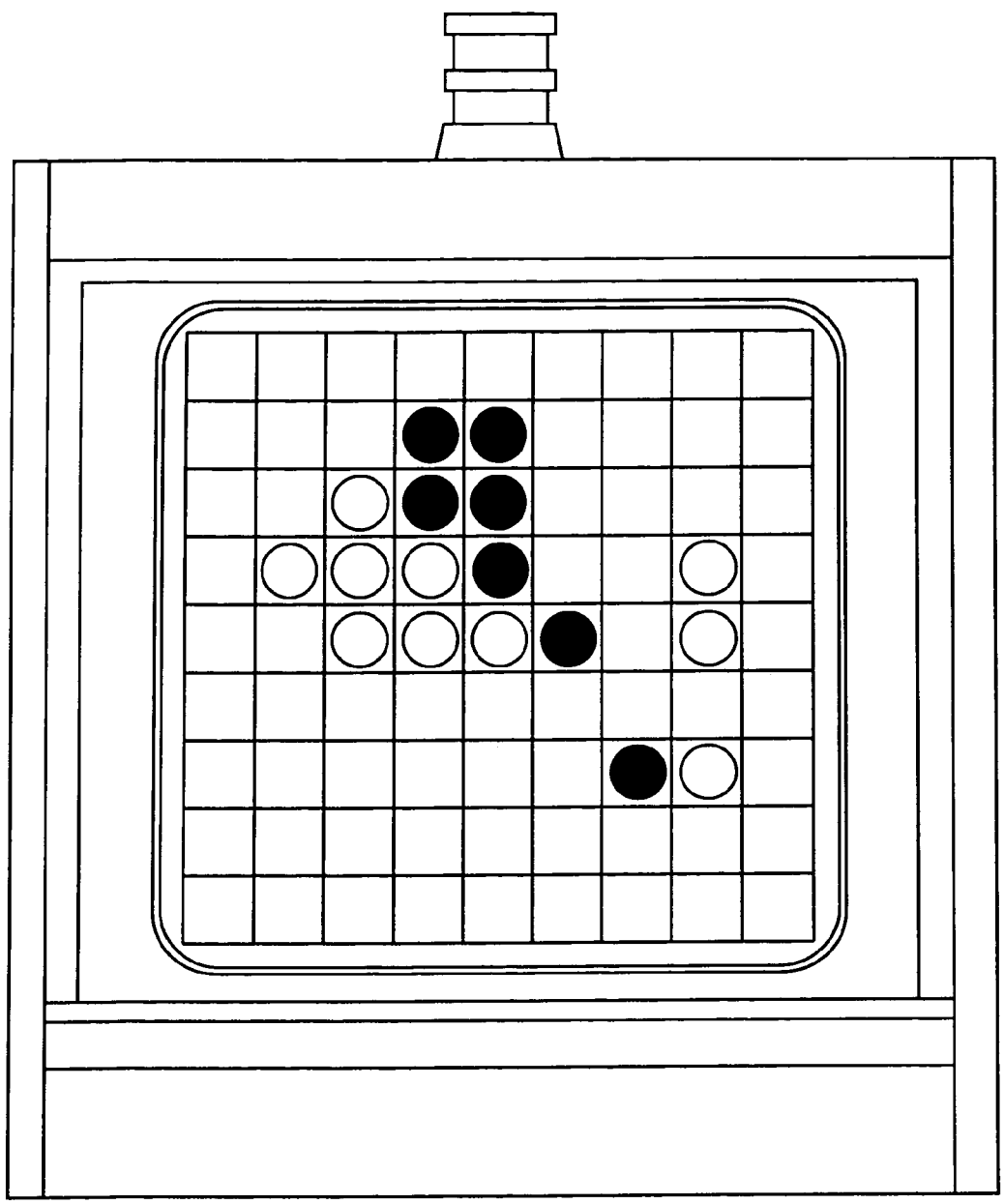
FIG. 5B shows a second possible result once a capturing configuration such as that shown in FIG. 5 has been achieved, in which both the captured and capturing game pieces are removed from the matrix.

As shown in FIG. 5A, only the game piece 20', 20 that lie in-line between the most recently positioned or repositioned game piece 20P and a like game piece 20L are removed from play. In addition, captured game pieces 20 belonging to the gamer who placed game pieces 20P and 20L on matrix 10 may also be removed from play. Optionally, as depicted in FIG. 5B, the capturing game pieces 20P, 20L may also be removed from play.

Exemplary awards that may be granted to a gamer once captured game pieces 20', 20 are removed from play include, without limitation, points, game credits, monetary awards, prizes, and the like. The per-game piece 20', 20 award may increase with an increase in the number of game pieces 20', 20 that are removed from play.

Once captured game pieces 20', 20 have been removed from play, process may flow to reference character 116 of FIG. 2, wherein the capturing gamer is required to wait for or to obtain another turn. Alternatively, and as an additional award to the gamer for capturing one or more game pieces 20', 20 removed from play in lieu of possibly another turn, in which case process returns to reference character 110 of FIG. 2.

In a variation of the above-described embodiment of competitive matrix type game, which is depicted by the flow chart of FIG. 2A, a gamer may opt out of having one or more captured game pieces 20', 20 removed from play in lieu of possibly receiving a greater award for later having additional captured game pieces 20', 20 that are located along the same line in which a capturing event has previously occurred removed from play.

Figure 2A:
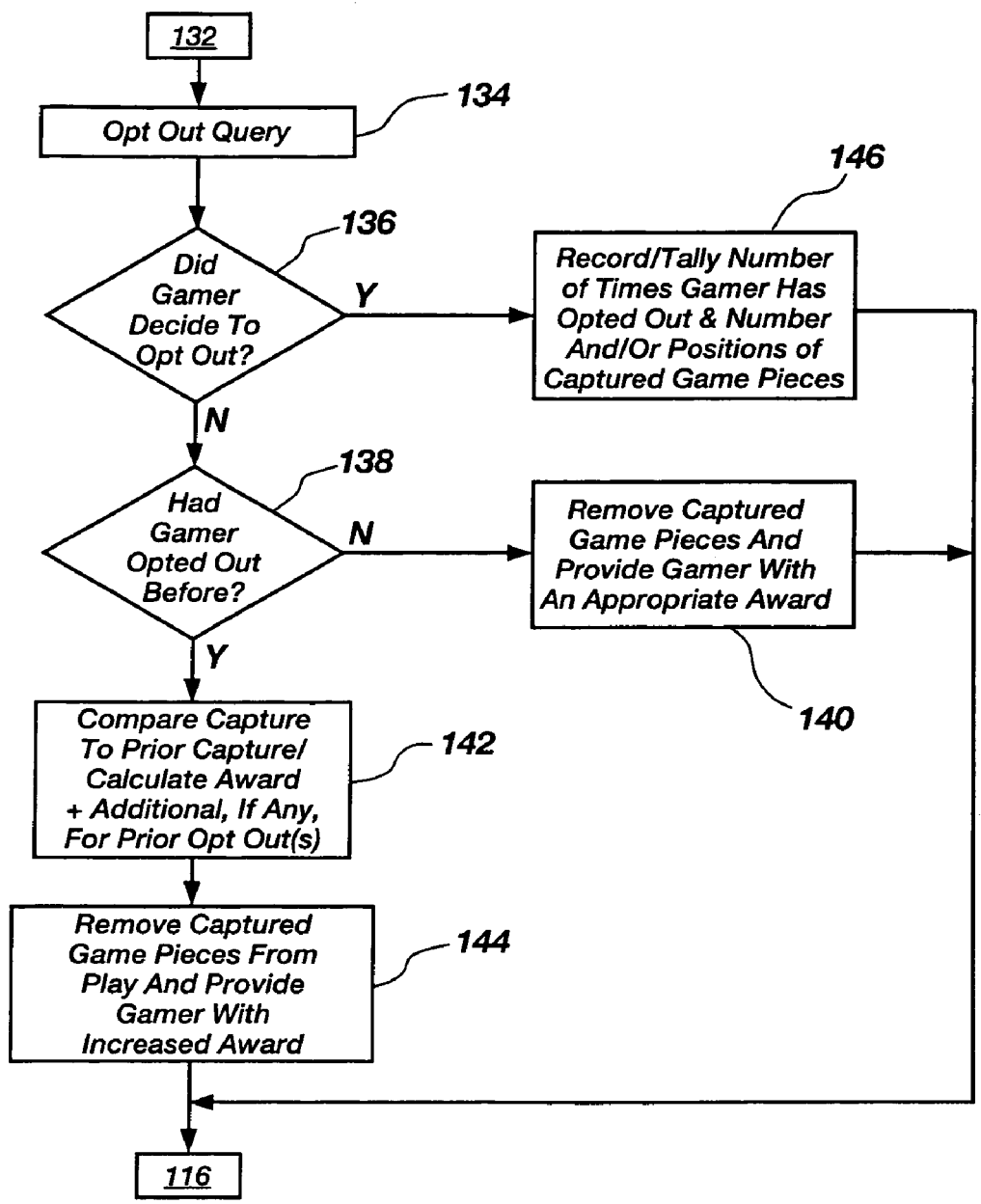
FIG. 2A is a flow chart depicting an option to the method of game play illustrated in FIG. 2, in which a gamer may opt out of receiving an award for a capturing event in lieu of the chance to later receive an increased award.

By way of example only, following the inquiry at reference character 132, the capturing gamer may be queried, at reference character 134 of FIG. 2A, as to whether or not he or she desires to opt out of having one or more captured game pieces 20', 20 removed from play in lieu of a chance to receive a greater award.

If it is determined at reference character 136 of FIG. 2A that the gamer has opted to take a chance at removing more game pieces 20', 20 from play in a subsequent turn, process flows to reference character 146 of FIG. 2A, where the gamer's decision to opt out of having one or more captured game pieces 20', 20 removed from play is recorded or stored along with either or both of the number and location of each game piece 20', 20 that would have been removed from play had the gamer not opted out. Such information is recorded for subsequent evaluation in the event that the gamer again captures one or more of the previously captured game pieces 20', 20.

Alternatively, if a gamer chooses to opt out of having one or more captured game pieces 20, 20' removed from play in lieu of the opportunity to receive an increased award (e.g., for capturing more pieces, simply for capturing game pieces following a decision to opt out, or some combination thereof), the captured game pieces 20, 20' may be converted, possibly providing the opting-out gamer with an increased chance to subsequently capture other or more game pieces 20, 20', but with the risk that the gamer's game pieces 20 may be subsequently captured by another gamer.

If it is determined at reference character 136 of FIG. 2A that the gamer desires to receive an award for having one or more captured game pieces 20', 20 removed from play, process flows to reference character 138, where an inquiry is made as to whether or not the gamer, during a previous turn, had opted out of receiving an award for having one or more captured game pieces 20', 20 removed from play. If the gamer had not previously opted out of receiving an award for removing one or more captured game pieces 20', 20 from play, process flows to reference character 140 of FIG. 2A, where each captured game piece 20', 20 is (and, optionally, game pieces 20P and 20L are) removed from play and the gamer is provided with an appropriate award. If the gamer did opt out of receiving an award for removing one or more captured game pieces 20', 20 from play during a previous turn, process flows to reference character 142 of FIG. 2A, at which information that has been recorded or stored regarding each previous opted-out-of capture is evaluated and, possibly, compared with the current capture in calculating an award for the capturing gamer. Next, at reference character 144 of FIG. 2A, each of the captured game pieces 20', 20 (and, optionally, game pieces 20P and 20L) is removed from play and the gamer provided with the appropriate award. In either event, process then flows to reference character 116, where the gamer may be required to wait for or to obtain another turn.

Figure 6:
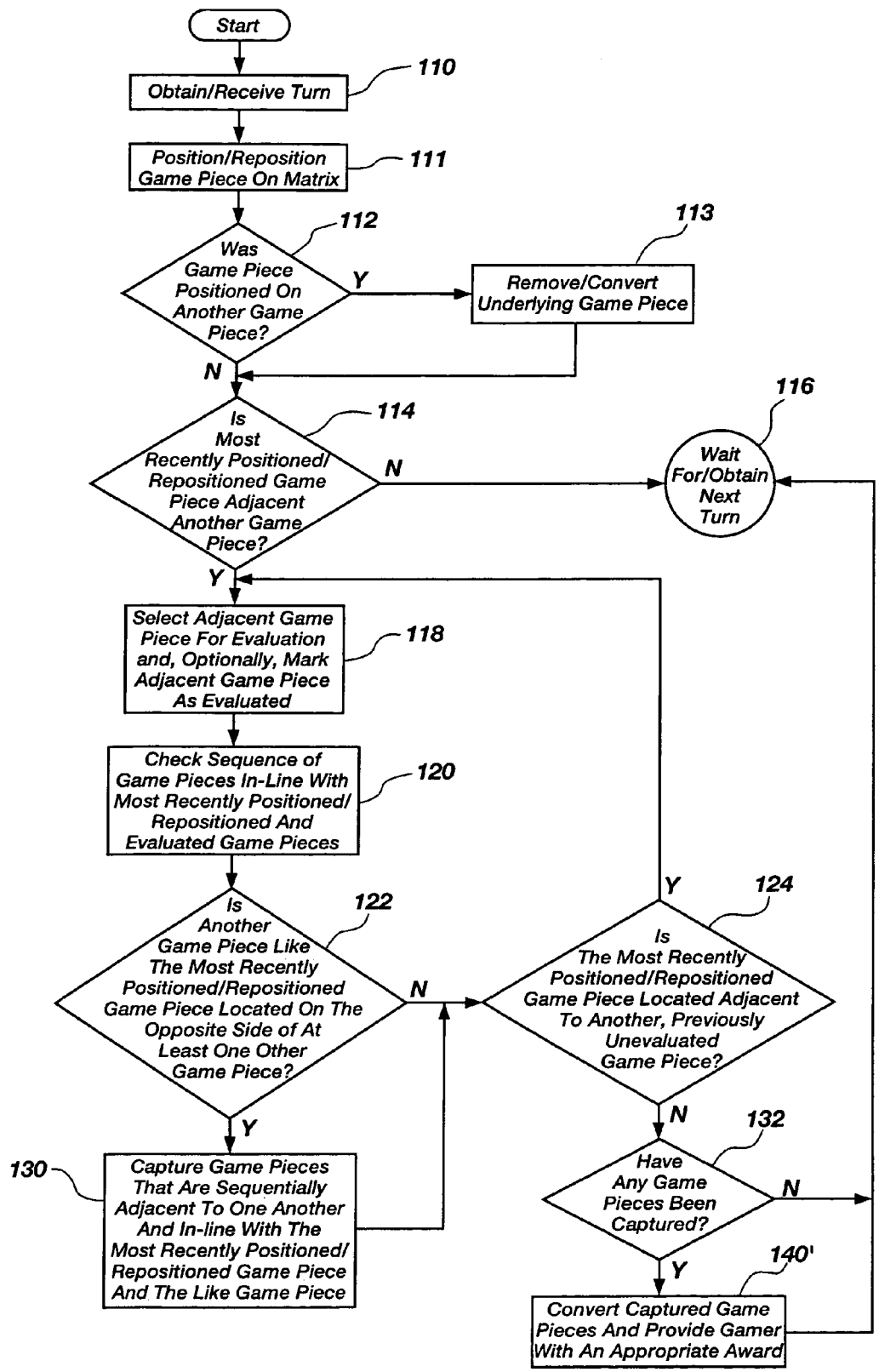
FIG. 6 is a flow chart depicting another embodiment of competitive, matrix type game of the present invention, in which a gamer attempts to capture game pieces of a computer or one or more other gamers by positioning like game pieces at opposite ends of sequentially adjacent game pieces that are arranged in-line on the matrix and captured game pieces of the computer or another gamer are replace with game pieces of the capturing gamer.
Figure 7:
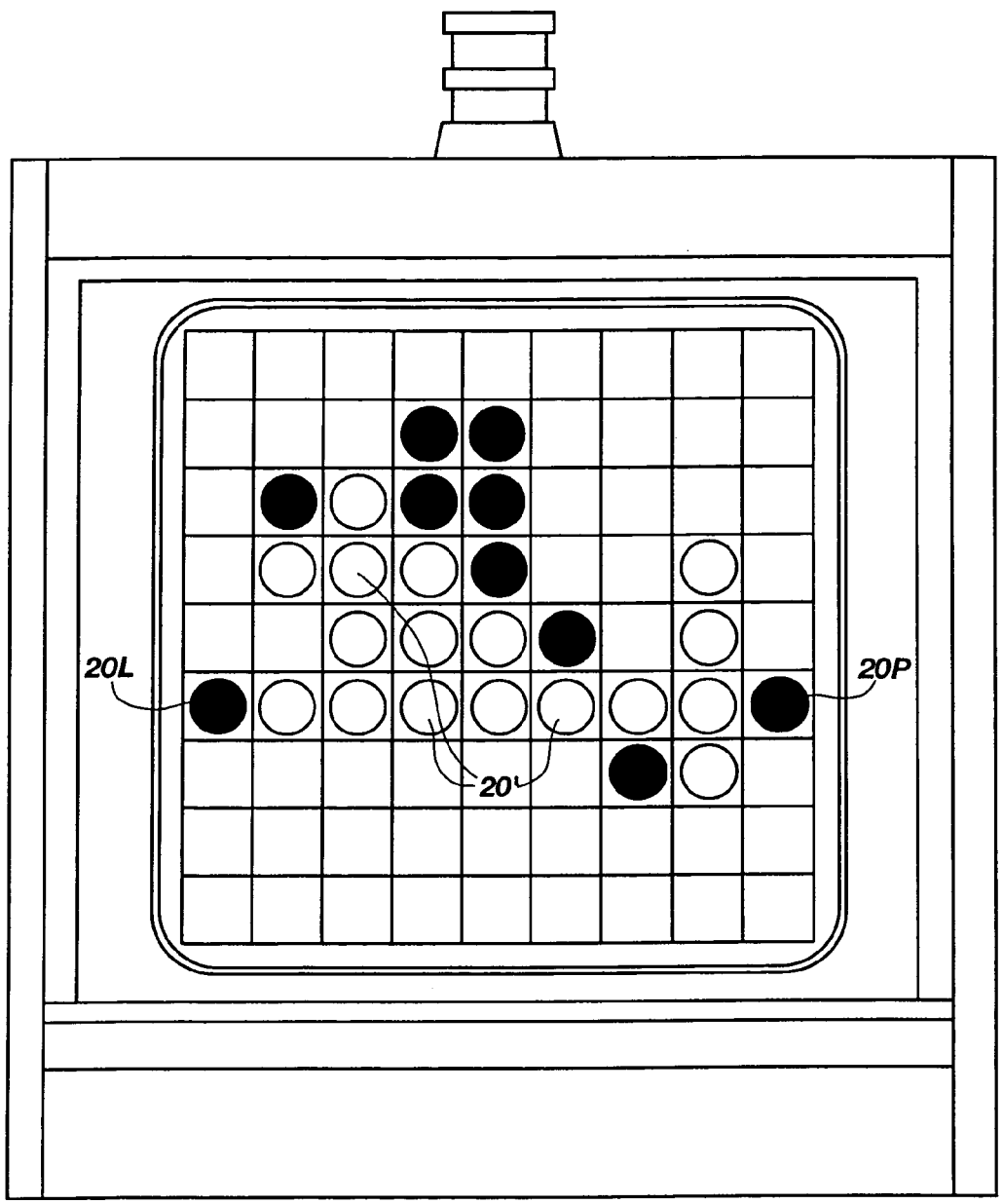
FIG. 7 depicts an exemplary capturing configuration of game pieces according to the embodiment of a matrix type game depicted in FIG. 6.
Figure 7A:
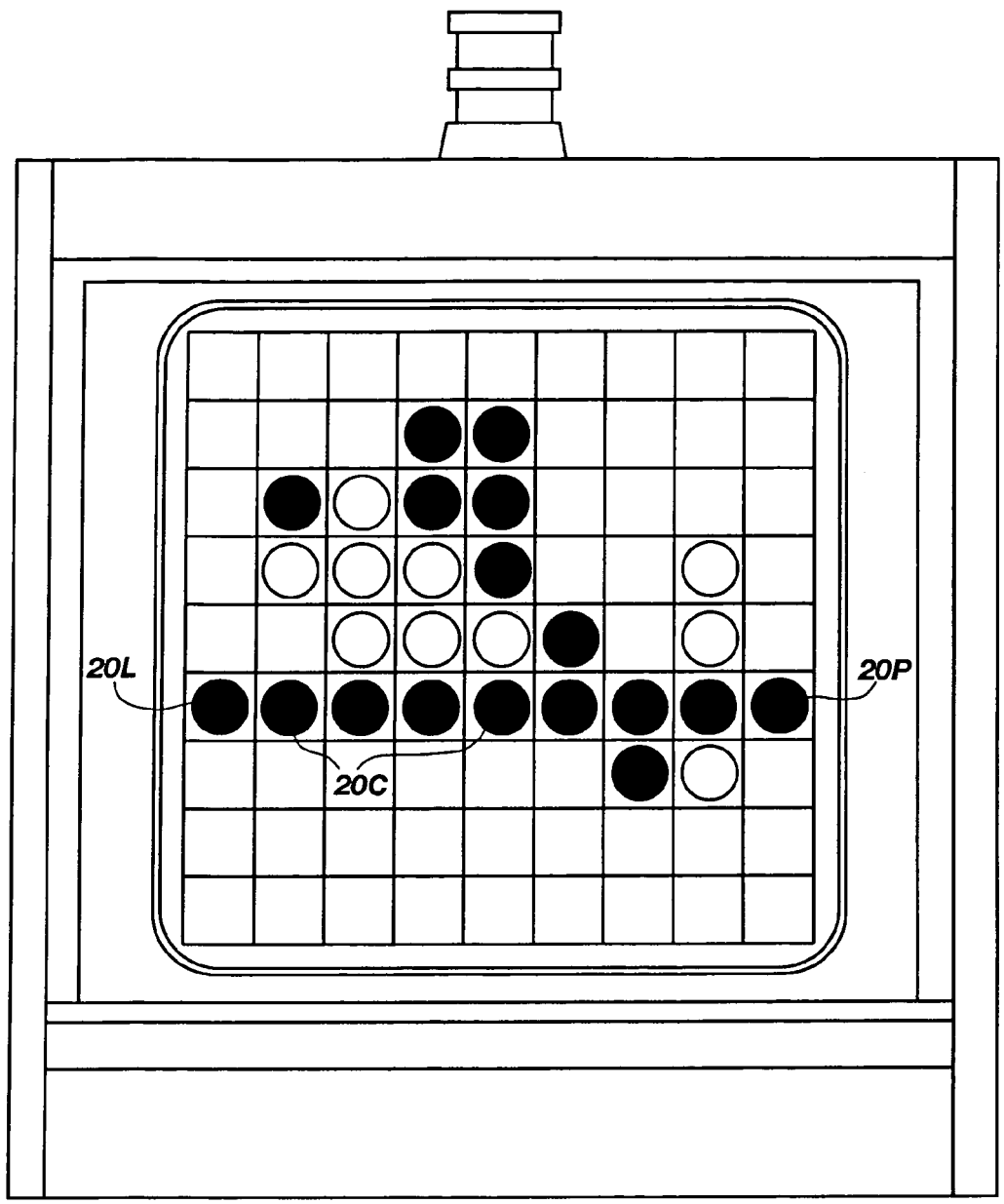
FIG. 7A shows a possible result once a capturing configuration such as that shown in FIG. 7 has been achieved, in which the identities of only the captured game pieces that are located along the same line as that in which an initial capturing event occurs are converted.

Turning now to the flow chart of FIG. 6, play of another exemplary embodiment of a competitive matrix type game of the present invention is depicted. The majority of the process flow of the embodiment of the game depicted in FIG. 6 follows the same course as that of the game embodiment shown in the flow chart of FIG. 2. When one or more game pieces 20', 20 are in-line with and sequentially adjacent to one another and in-line with and surrounded by the most recently positioned or repositioned game piece 20P and a like game piece 20L belonging to the same gamer who placed game piece 20P, as depicted in FIG. 7, the game pieces 20', 20 located between game pieces 20P and 20L are deemed to be captured. As shown in FIG. 7A, rather than removing each captured game piece 20', 20 (and optionally game pieces 20P and 20L) from play, however, the captured game pieces 20' are replaced with game pieces having the same identity as game pieces 20P and 20L (i.e., belonging to the gamer who positioned game pieces 20P and 20L) at reference character 140' of FIG. 6. These captured game pieces 20' are referred to herein as "converted" or "flipped" game pieces 20C.

An award may be granted to the capturing gamer each time a game piece 20' is converted, when the gamer chooses to exit the game, or when both of these events occur.

As with the previous embodiment of the game, the gamer may choose to opt out of converting one or more captured game pieces 20' in lieu of the chance to receive an increased award for subsequently recapturing these game pieces 20' along with one or more additional game pieces 20', as illustrated in the flow chart of FIG. 6A. Again, instead of having captured game pieces 20' removed from play to receive an award, the captured game pieces 20' are replaced with game pieces 20 having the same identity of those that belong to the capturing gamer (i.e., that look the same as game pieces 20P and 20L) at reference characters 140' and 144' of FIG. 6A. Following a subsequent capturing event by that gamer, the award that is granted to the gamer may be increased appropriately.

Figure 6A:
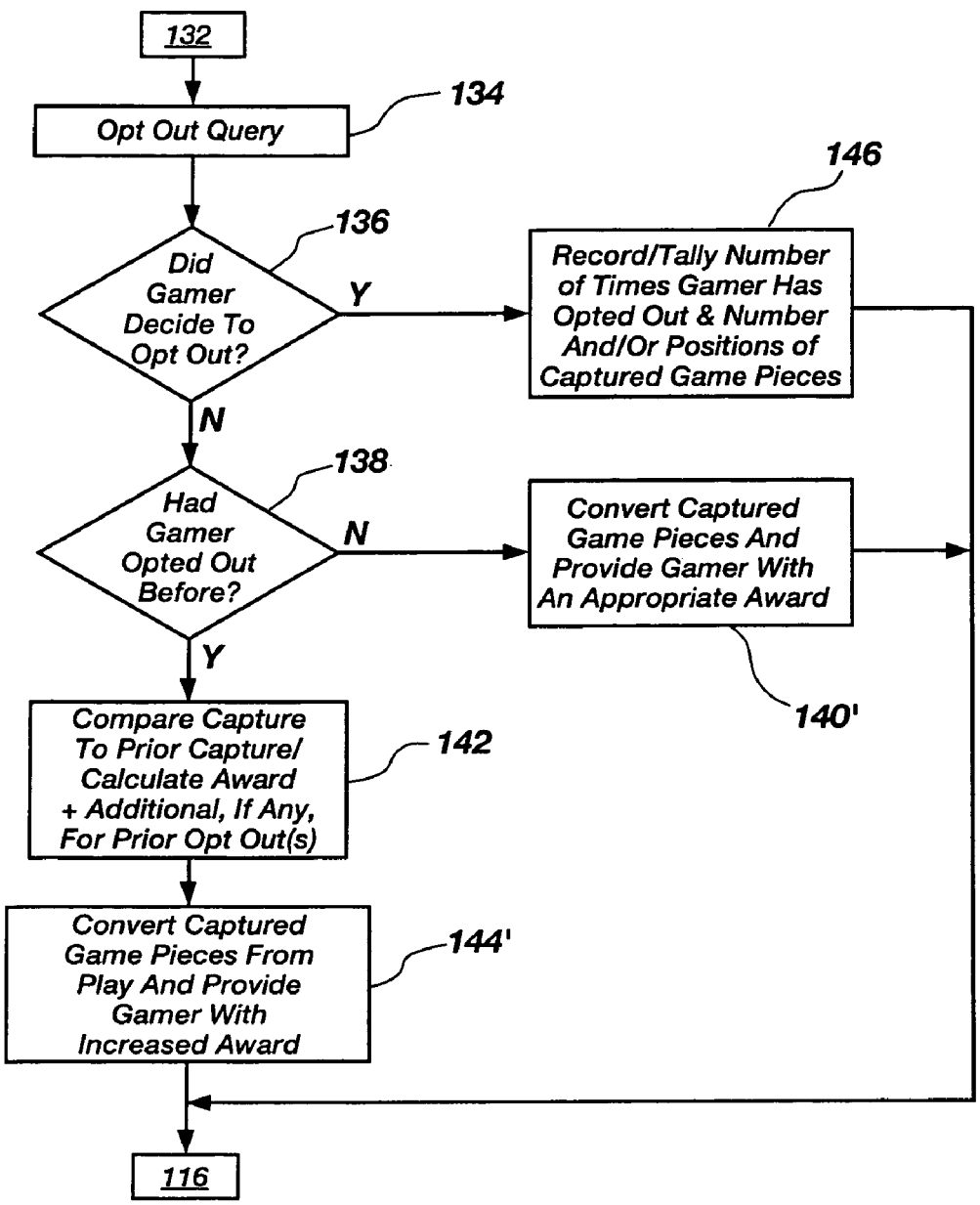
Figure 6B:
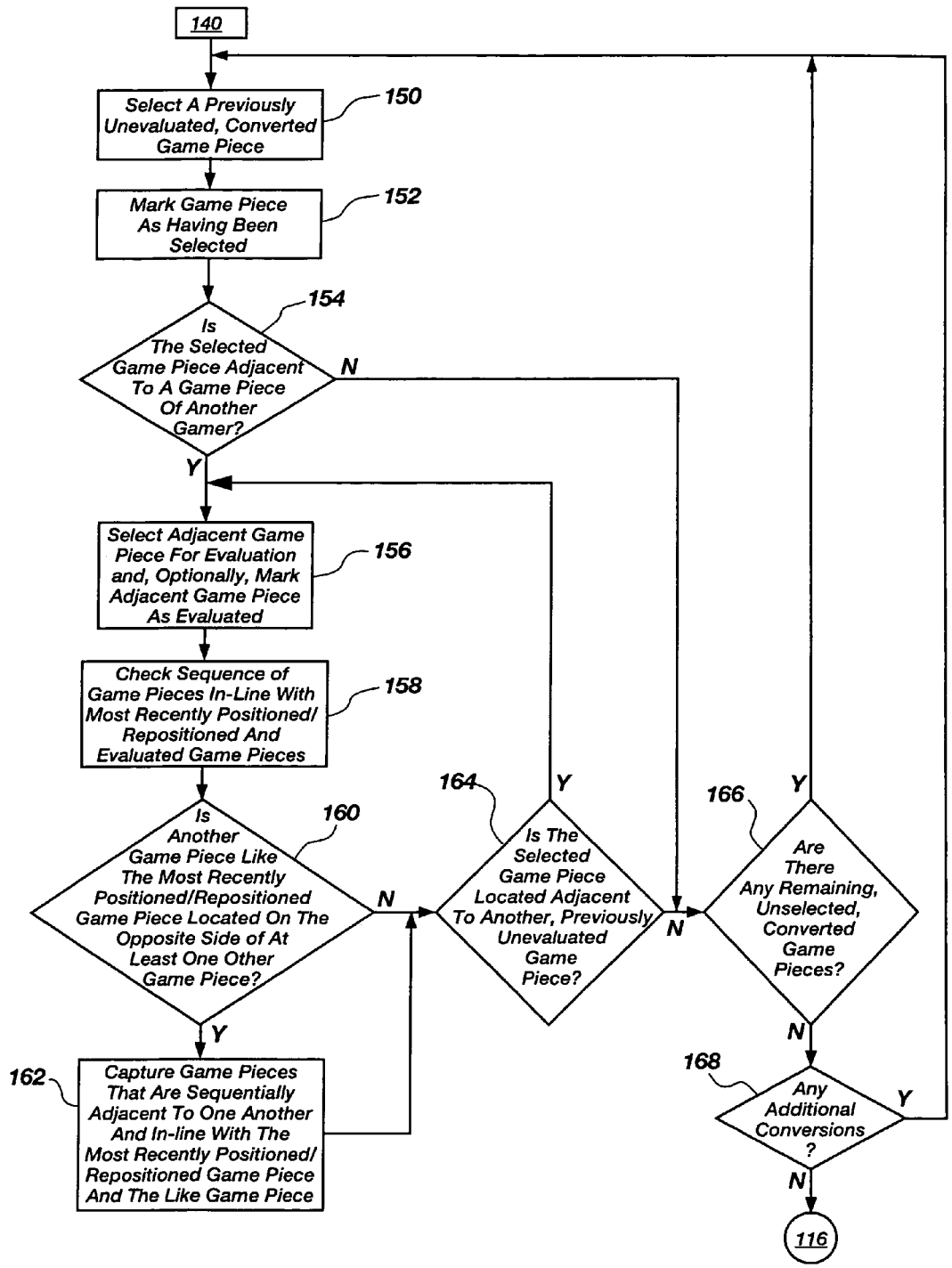
Figure 7B:
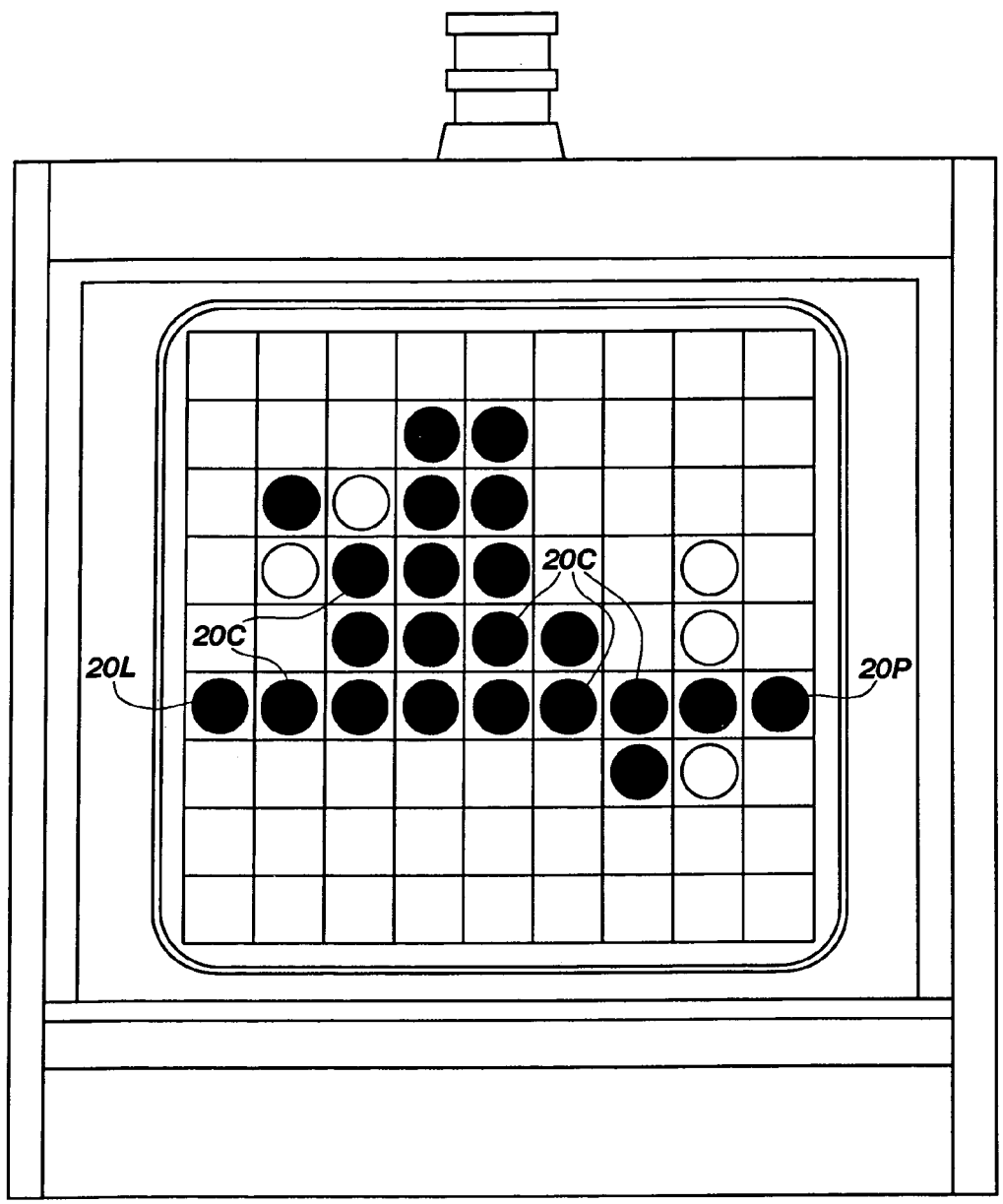
FIG. 7B shows another possible result once a capturing configuration such as that shown in FIG. 7 has been achieved, in which cascaded capturing and, thus, conversion may occur along multiple lines.

Optionally, as shown in the flow chart of FIG. 6B and depicted in FIG. 7B, conversion of one or more game pieces 20' to game pieces 20C, at reference character 140 of FIG. 6, may trigger one or more additional capturing events. Once one or more game pieces 20' have been converted at reference character 140', process may flow to reference character 150 of FIG. 6B, where a converted game piece 20C is selected for evaluation. Next, at reference character 152 of FIG. 6B, the selected, converted game piece 20C may be marked as such to prevent duplicative evaluation thereof.

At reference character 154 of FIG. 6B, an inquiry is made as to whether or not the selected, converted game piece 20C is positioned adjacent to a game piece 20' of the computer or another gamer against which or whom the game is being played. If it is determined that there is no game piece 20' of the computer or another gamer adjacent to the selected, converted game piece 20C, process flows to reference character 166 of FIG. 6B, at which a determination is made as to whether or not any converted game pieces 20C remain which have not been previously selected for evaluation. In the alternative, process may flow to reference character 156 of FIG. 6B, where the game piece 20' positioned adjacent to the selected, converted game piece 20C may be identified and marked as an evaluated game piece.

Next, at reference character 158 of FIG. 6B, all of the sequentially adjacent game pieces 20, 20' that are in-line with the selected, converted game piece 20C and the evaluated game piece 20' adjacent thereto are evaluated to facilitate a determination of whether or not any game pieces 20' of the computer or another gamer are positioned between and in-line with game pieces 20C and a like game piece 20L, at reference character 160 of FIG. 6B.

If it is determined, at reference character 160, that one or more game pieces 20' are located between and in-line with the selected, converted game piece 20C and like game piece 20L, process flows to reference character 162 of FIG. 6B, where each such game piece 20' is identified as having been captured. Process then flows to reference character 164 of FIG. 6B. If, at reference character 160 of FIG. 6B, it is instead determined that none of the game pieces 20, 20' that are in-line with the selected, converted game piece 20C and the evaluated game piece 20' are positioned between game piece 20C and a like game piece 20L, process flows directly to reference character 164 of FIG. 6B.

At reference character 164 of FIG. 6B, a determination is made as to whether or not the selected, converted game piece 20C lies adjacent to another game piece 20' of the computer or another gamer. If so, process flow returns to reference character 156 of FIG. 6B. Otherwise, process flows to reference character 166 of FIG. 6B.

At reference character 166, an inquiry is made as to whether or not any of converted game pieces 20C have yet to be selected for evaluation. If so, process flow returns to reference character 150 of FIG. 6B, where another converted game piece 20C may be selected and evaluated. Otherwise, process flows to reference character 168 of FIG. 6B, at which a determination is made of whether or not any additional game pieces 20' have been captured as a result of previous conversions of one or more game pieces 20' to game pieces 20C.

If it is determined, at reference character 168, that one or more additional game pieces 20' have been captured, process flows back to reference character 140', where each captured game piece 20' is changed to a converted game piece 20C and the capturing gamer is granted an appropriate award. Further evaluations may then be conducted to determine whether or not any other game pieces 20' have been captured as a result of such conversion. Otherwise, the process flows to reference character 116, where the gamer may be required to wait for or to obtain another turn.

Of course, the variations depicted in FIGS. 6A and 6B may be affected in combination, providing a gamer with an opportunity to opt out of a potentially cascading capture and conversion event in lieu of the chance to obtain an even greater award.

The flow chart of FIG. 8 and FIGS. 9, 9A and 9B depict yet another embodiment of competitive matrix type game that incorporates teachings of the present invention. In the game embodiment of FIGS 8–9B, a gamer is required to position more than two game pieces along the same line 11 of a matrix 10 in order to capture game pieces 20', 20 that are located along that line 11.

Process flow begins in the same manner as that described above with respect to FIG. 1 and the flow chart of FIG. 2. Once a gamer has positioned or repositioned a game piece 20P, shown in FIG. 9, however, process flows to reference character 216 of FIG. 8, where a line 11E of matrix 10 that passes through the most recently positioned or repositioned game piece 20P is selected for evaluation. At reference character 218 of FIG. 8, the line 11E that has been selected for evaluation may be marked or otherwise identified as evaluated so as to prevent subsequent evaluation thereof during the current turn of the game.

Figure 8:
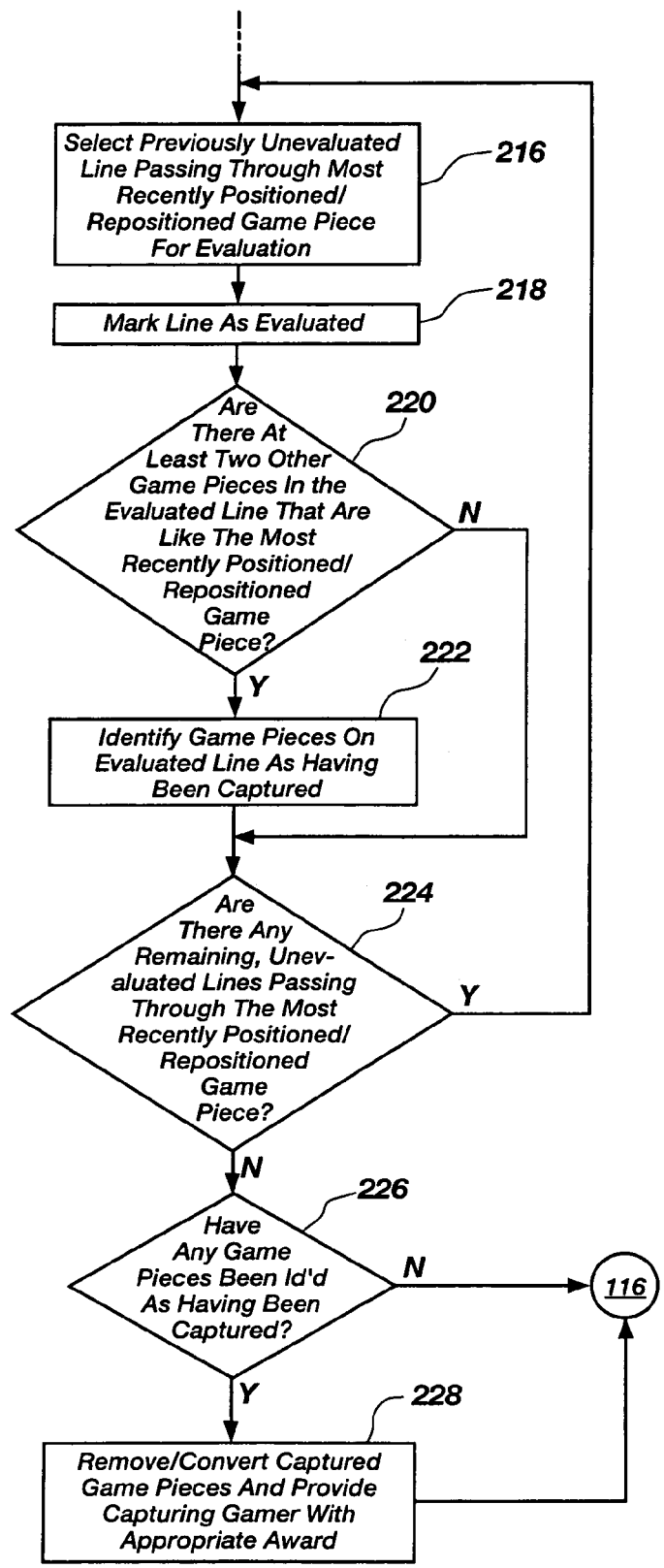
FIG. 8 is a flow chart that depicts another embodiment of competitive, matrix type game according to the present invention, in which a gamer attempts to position more than two like game pieces in-line with one another to capture the game pieces of the computer or at least one other gamer that are also positioned along that line of the matrix.

Next, at reference character 220 of FIG. 8, a determination is made of whether or not at least two other game pieces 20L that are like the most recently positioned or repositioned game piece 20P, or that belong to the gamer who placed the most recently positioned or repositioned game piece 20P in its current location, are located along the evaluated line 11E. If so, process flows to reference character 222 of FIG. 8, where at least the game pieces 20' of the computer or another game against which the game is being played are identified as having been captured. In addition, the game pieces of the capturing gamer, including the most recently positioned or repositioned game piece 20P and the at least two like game pieces 20L, may also be identified as having been captured. Process then flows to reference character 224 of FIG. 8. If, on the other hand, there are not at least two game pieces 20L that are like the most recently positioned or repositioned game pieces 20P on the evaluated line 11E, process flows directly to reference character 224 of FIG. 8.

At reference character 224, an inquiry is made as to whether or not any of the lines 11 of matrix 10 that pass through the most recently positioned or repositioned game piece 20P have yet to be evaluated. If so, process flow returns to reference character 216 of FIG. 8, where another line 11 of matrix 10 that passes through the most recently positioned or repositioned game piece 20P may be evaluated. Otherwise, process flows to reference character 226 of FIG. 8.

Figure 9:
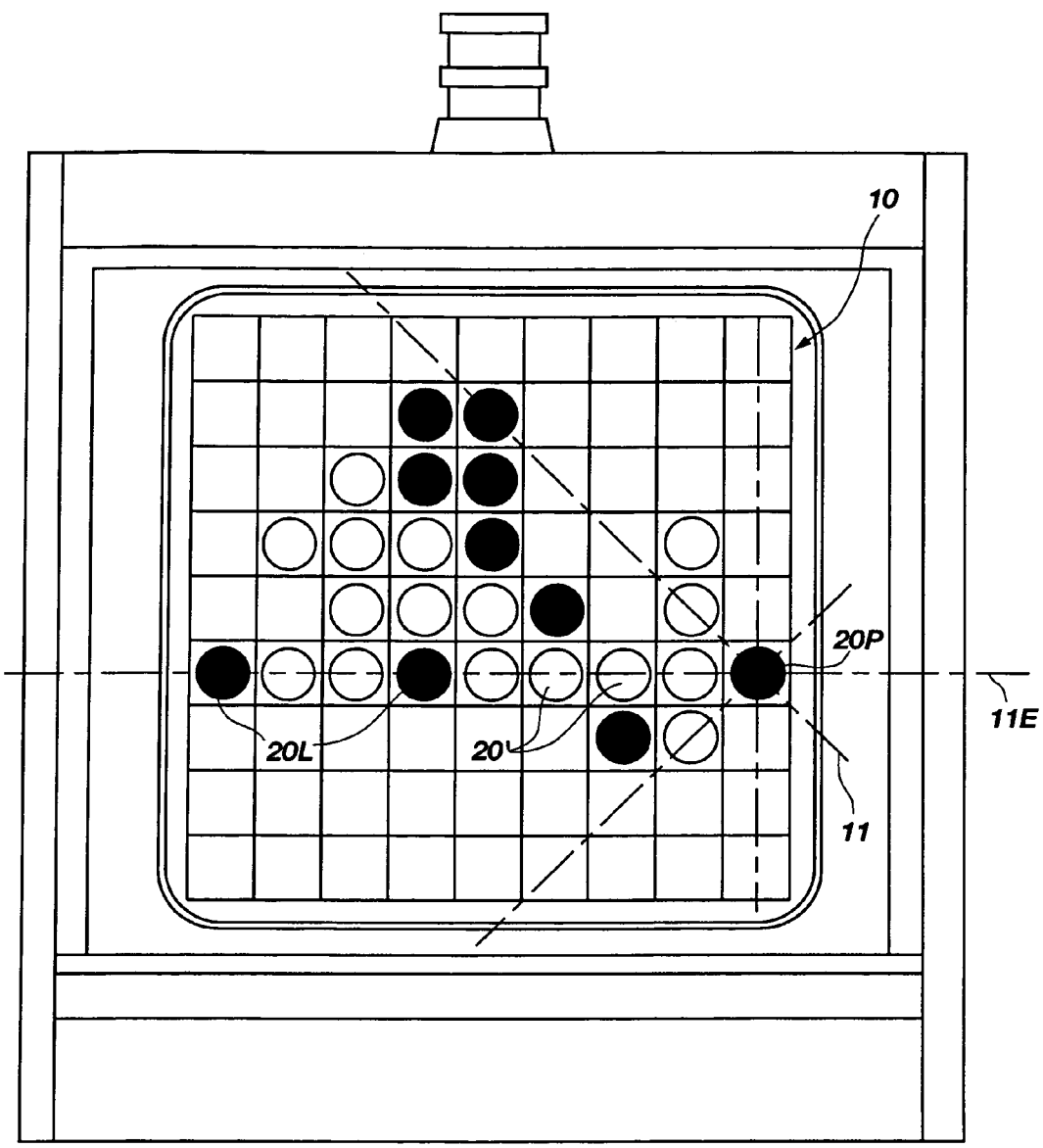
FIG. 9 illustrates an exemplary capturing configuration of game pieces in accordance with the embodiment of a matrix type game depicted in FIG. 8.
Figure 9A:
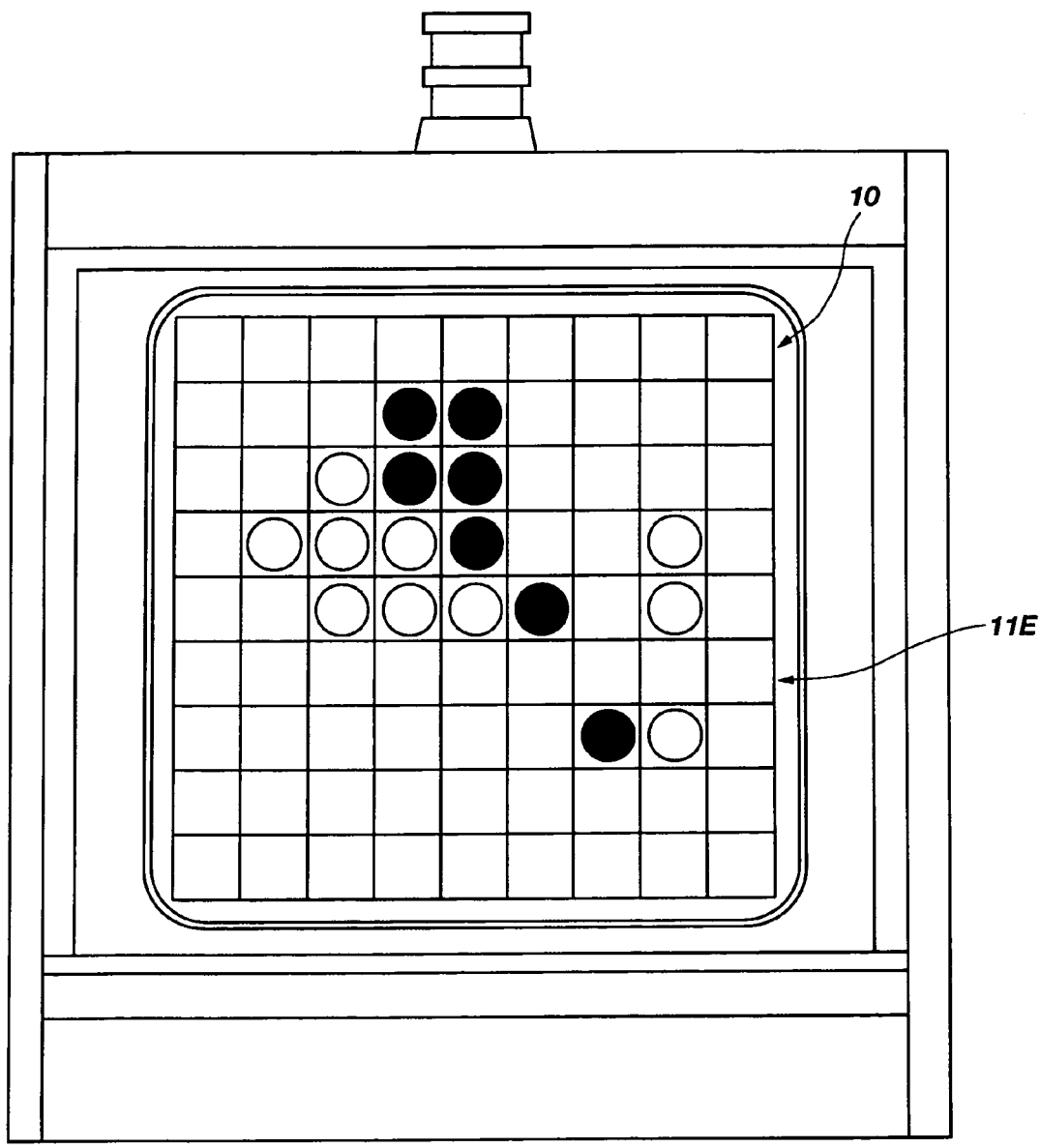
FIG. 9A illustrates a first possible result once a capturing configuration such as that shown in FIG. 9 has been obtained, in which at least the captured game pieces are removed from the matrix.
Figure 9B:
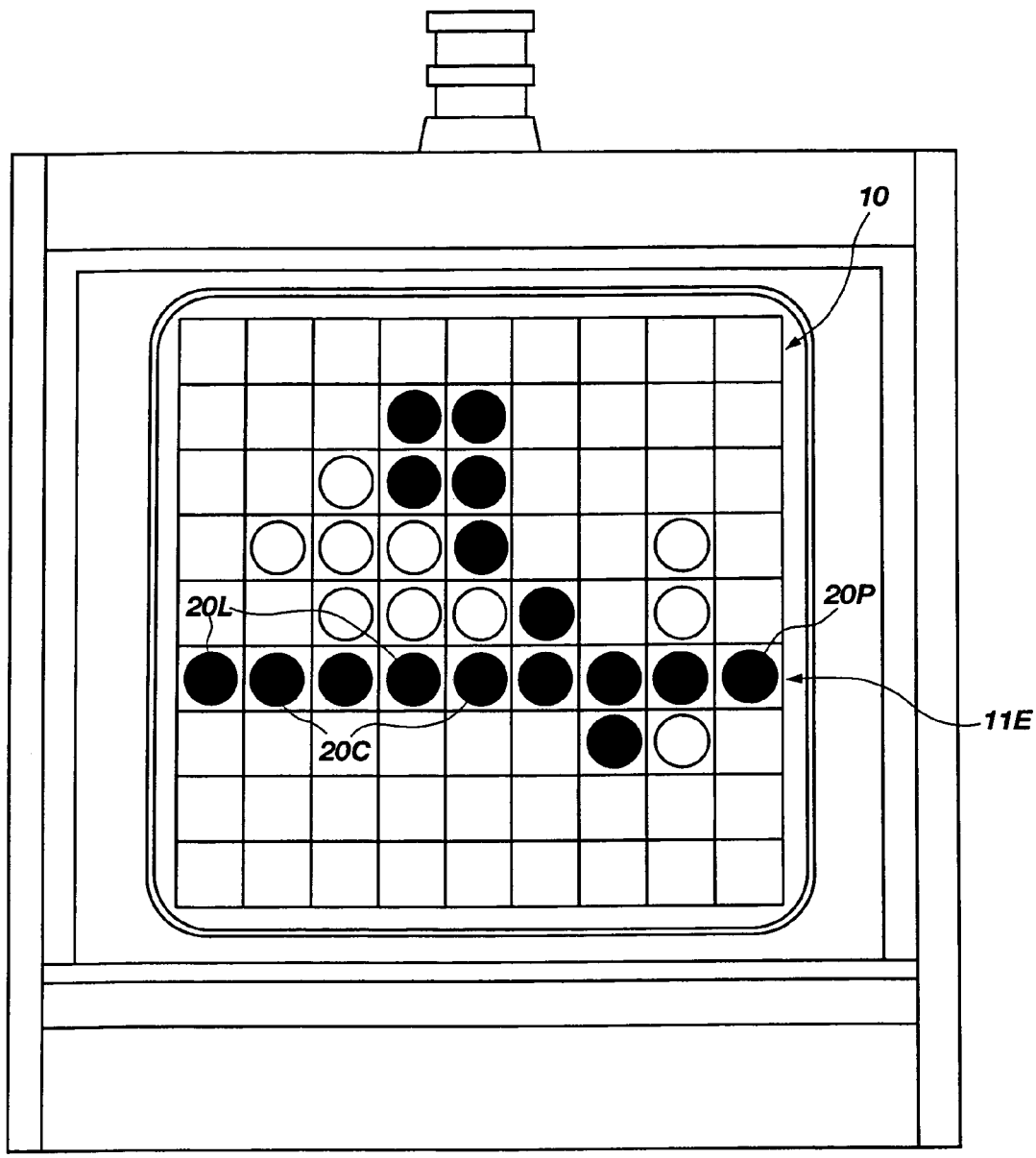
FIG. 9B illustrates another possible result once a capturing configuration such as that shown in FIG. 9 has been obtained, in which the captured game pieces are become the capturing gamer's.

At reference character 226, a determination is made as to whether or not any game pieces 20' (and, possibly, game pieces 20P, 20L) on matrix 10 are identified as having been captured. If not, the gamer may have to wait for or obtain another turn, at reference character 116 of FIG. 8. If one or more game pieces 20', 20 are identified as captured game pieces, process flows to reference character 228 of FIG. 8, where each captured game piece 20', 20 may be removed from play, as shown in FIG. 9A, or be converted to have the same appearance as game pieces 20P and 20L and, thus become the game pieces of the capturing gamer, as illustrated in FIG. 9B. Also at reference character 28, an award may be granted for each removed or converted game piece 20', 20.

The opt-out options that are depicted in FIGS. 2A and 6A may be applied, as appropriate, to the game depicted in FIG. 8 (i.e., the opt-out option depicted in FIG. 2A employed if captured game pieces 20', 20 are removed from play and the opt-out option depicted in FIG. 6A employed if captured game pieces 20' are converted).

If captured game pieces 20' are converted during play of the game depicted in FIG. 8, one or more of the conversions may have a cascading effect of the type described in reference to the flow chart of FIG. 6B.

A game incorporating teachings of the present invention may be implemented as a stand-alone game or be provided as a bonus event to a primary game.

Entry into the game of the present invention from a base, or primary game may be gained, as known in the art. By way of example only, the occurrence of one or more prespecified events during play of the primary game may qualify a gamer for entry into the bonus event. Such events may include, without limitation, certain combinations of symbols along one or more paylines during play of a slot machine type primary game and certain card combinations in primary games of poker or blackjack. Alternatively, the opportunity to enter into the bonus event may be granted to a gamer upon achieving a certain amount of winnings during play of the primary game, or simply for completing a round of the primary game. Of course, the occurrence of other types of events or prespecified combinations of events during play of the primary game may also qualify a gamer for entry into a bonus event that comprises a game incorporating teachings of the present invention.

Once a gamer has qualified for a bonus event comprising the inventive game, continued play of the bonus event may be automatic or based on requalification after the gamer takes a turn in the bonus game. Turns may be granted on an orderly, repetitive basis, in the order in which qualifying events occur, based on a gamer's response speed, or some combination thereof. Optionally, if turns are granted at least partially on the basis of a gamer's response speed, a gamer who obtains a turn may be able to prevent other gamers from taking a turn for a limited period of time, which may be automatically granted, granted on the basis of a result in an associated primary game, or purchased by a gamer with game credits or money.

A player may terminate play of the game at his or her own option at any time, or the game may automatically terminated when one or more of the competing gamers have placed a prespecified, maximum number of game pieces 20, 20' upon matrix 10.

In stand-alone embodiments of the game of the present invention, turns are preferably granted in repeated sequence.

In an example of manual implementation of the game and with returned reference to FIG. 1, matrix 10 may be embodied as a game board and game pieces 20, 20' as members that are sized to be positioned at intersection points 16 or on spaces 18 of matrix 10. Game pieces 20, 20' that belong to different gamers may be readily distinguished from one another by their physical appearances. By way of example only, game pieces 20 belonging to a first gamer may have a different color than game pieces 20' that belong to another gamer.

The game may be electronically implemented by, for example, providing an electronically generated matrix 10 with electronically generated game pieces 20, 20' that may be positioned and/or moved under the control of a gamer by providing a desired input, as will be described hereinafter in further detail.

Figure 10:
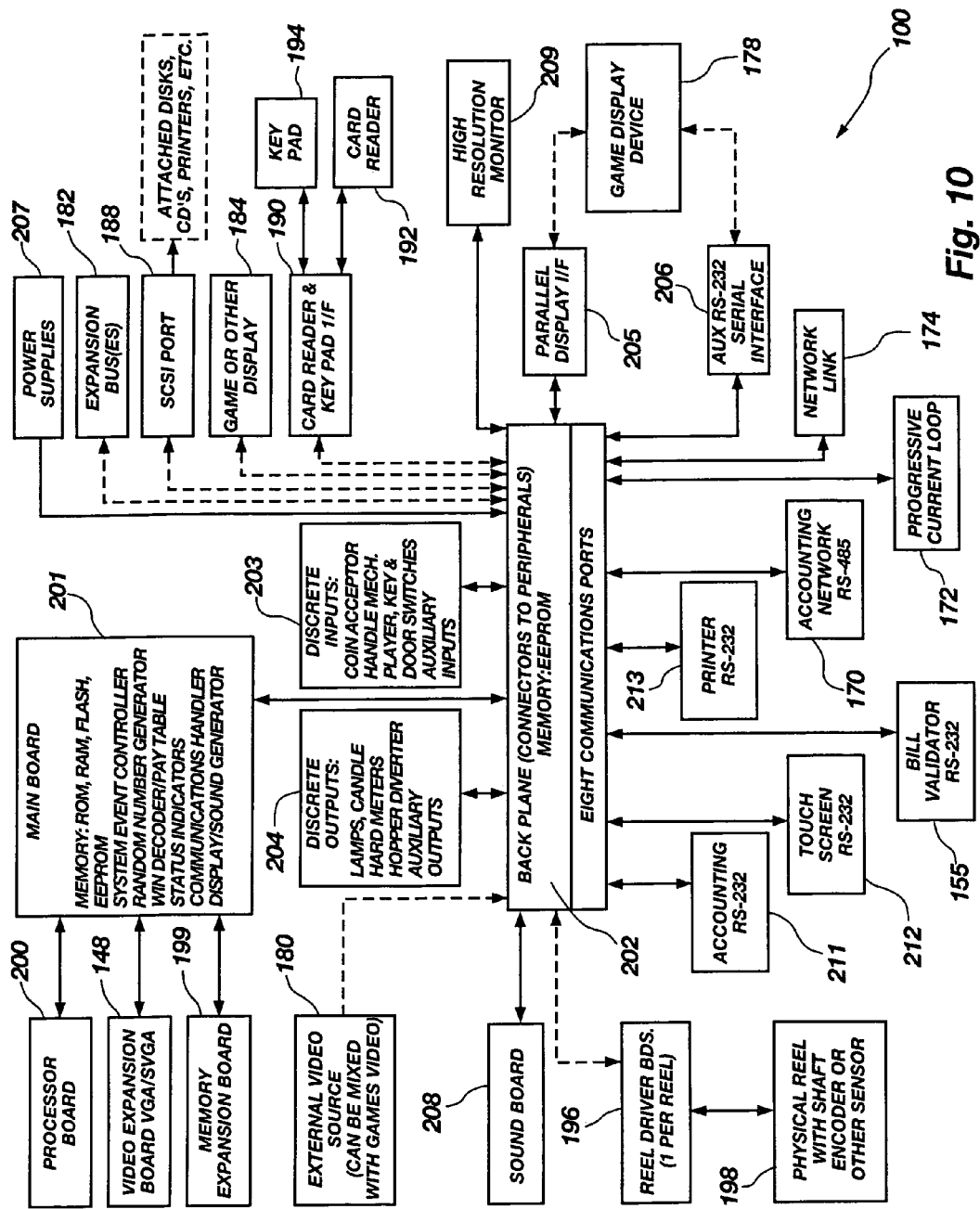
FIG. 10 is a schematic representation of an exemplary gaming machine by which a competitive, matrix type game incorporating teachings of the present invention may be implemented.

In use and operation, and referring to FIG. 10, an exemplary gaming machine or device 100 by which a game incorporating teachings of the present invention may be implemented includes a memory board 140, a processor board 142, a main board 144 and a back plane 146, which may be integral or separately formed elements that are associated with one another in such a way as to establish communication therebetween. Memory board 140, processor board 142, which preferably includes a graphics system processor, and a video expansion board 148 (e.g., a VGA/SVGA board), may be operably coupled to the main board 144, such as by way of plug-in type physical and electrical connections.

Main board 144 may include memory in the form of ROM and RAM, as well as flash memory, EEPROM (electrically erasable programmable read only memory), and/or any other type of suitable memory element known in the art. In addition, main board 144 may include any combination of a system event controller, a random number generator, a win decoder/pay table, status indicators, a communications handler, and a display/sound generator.

Main board 144 communicates with back plane 146, which may include additional memory, such as in the form of an EEPROM, and connectors for use with internal peripheral components of gaming machine 100. By way of example, main board 144 may be operably coupled (e.g., plugged into) a separately manufactured back plane 146. Back plane 146 may also provide a plurality of communication ports for communicating with external peripheral components.

Back plane 146 also provides for electrical communication between discrete inputs 150 of gaming machine 100 and main board 144, which communicates with processor board 142 if processor board 142 is manufactured separately from main board 144. Examples of discrete inputs 150 of gaming machine 100 include, without limitation, coin acceptors, game buttons, mechanical hand levers, key and door switches, and other auxiliary inputs. In addition, gaming machine 100 may support input and output between a gamer and processor board 142 by way of one or more via interface modules that establish communication between expansion bus or buses 182 and/or SCSI port 188 and gamer-used devices, such as a heads-up display, a joystick, a keyboard, a mouse, or a data glove.

Furthermore, back plane 146 provides for electrical communication between discrete outputs 152 of gaming machine 100 and main board 144. Typically and by way of example only, elements of gaming machine 100 that provide discrete outputs 152 may be in the form of lamps, hard meters, hoppers, diverters, and other auxiliary outputs.

Back plane 146 also provides connectors for at least one power supply 154 for supplying power to processor board 142, for a parallel display interface (PDI) 156, and for a serial interface 158 that may be used with a game display device 178. In addition, back plane 146 provides connectors for a soundboard 160 and a high-resolution monitor 162. Furthermore, back plane 146 may include communication ports for operably coupling and communicating with an accounting network 164, a touch screen 166 (which may also serve as a game display device), a bill validator 155 incorporated in a currency (bill) acceptor, a printer 168, and accounting network 170, a progressive current loop 172, and a network link 174.

Optionally, back plane 146 includes connectors for sources 180 of video that are external to gaming machine 100, expansion buses 182, game or other displays 184, a SCSI port 188, and an interface 190 for at least one card reader 192 (debit/credit, player card, etc.) and key pad 194.

If gaming device 100 is configured for play of a reel-type game, back plane 146 may also include means for electronically coupling a plurality of reel driver boards 196 (one per reel), which drive physical game reels 198, and a shaft encoder or other sensor means to main board 144 and processor board 142. Of course, reels may be implemented electronically by display as video images, technology for such an approach being well known and widely employed in the art. In such an instance, reel driver boards 196 and physical game reels 198 with associated hardware are eliminated and the game outcome is instead generated by the random number generator on main board 144 and directly displayed on a video game display 184 and, optionally, on a separate game display device 178, as known in the art. Other gaming machine configurations for play of different wagering games such as video poker games, video blackjack games, video Keno, video bingo or any other suitable primary games are equally well known in the art.

It will also be understood and appreciated by those of ordinary skill in the art that selected components of gaming device 100 may be duplicated for play of a bonus game or event in accordance with the present invention, with associated peripherals and links thereto, for play of the bonus game. In the conventional situation wherein the bonus game of the present invention may be operably coupled as a "top box" or otherwise associated with a conventional, existing gaming machine 100 configured for play of a base game, many of the components illustrated in FIG. 10 and described with respect thereto will be duplicated, including separate software and associated memory for conducting play of the bonus event with associated pay tables for the bonus awards.

Figure 11:
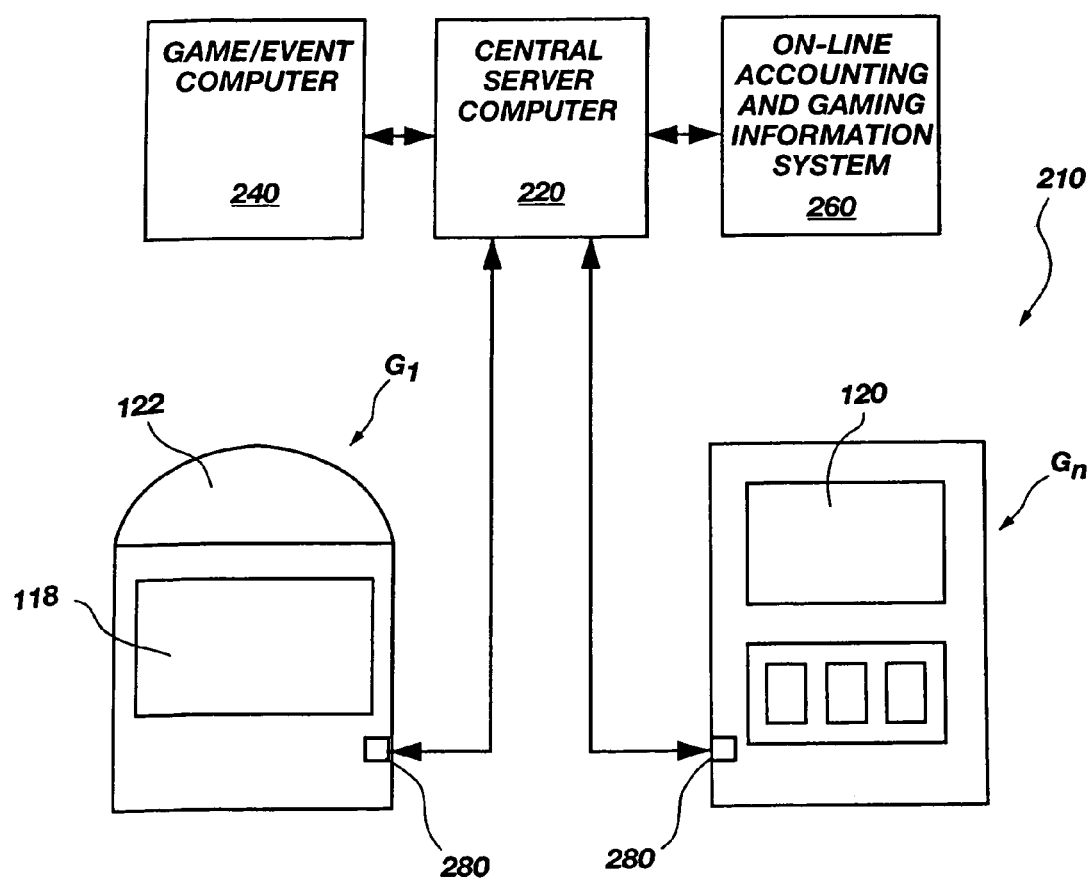
FIG. 11 schematically depicts a gaming system that includes a gaming terminal, such as the gaming machine shown in FIG. 10, and a central computer with which the gaming terminal communicates.

In implementation, gaming machines offering play of the bonus event of the present invention may be deployed, as schematically depicted in FIG. 11, in a gaming network 210 includes a central server computer 220 which is in communication with a plurality of gaming machine $G_1, G_2 \ldots G_n$, which may include electronic gaming machines, electro-mechanical gaming machines (e.g., reel type gaming machines), or a combination thereof. It is notable that, unless gaming network 210 is configured for linked, progressive play of a particular type of game, because the bonus event operates independently of the primary game on each gaming a variety of different makes of gaming machines $G_1, G_2 \ldots G_n$ offering widely different games may be incorporated in gaming network 210. Central server computer 220 may automatically interact with a plurality of gaming machines $G_1, G_2 \ldots G_n$ to activate a bonus event.

More specifically, and again referring to FIGS. 10 and 11, gaming network 210 includes a central server computer 220, a bonus event computer 240 and a plurality of gaming machines $G_1, G_2 \ldots G_n$. Each gaming machine $G_1, G_2 \ldots G_n$ includes a controller assembly 280 operably coupled to the central server computer 220 and is comprised of a controller unit designed to facilitate transmission of signals from each individual gaming machine $G_1, G_2 \ldots G_n$ to central server computer 220 for monitoring purposes. In addition, controller assembly 280 includes a network interface board fitted with appropriate electronics for each specific make and model of each individual gaming machine $G_1, G_2 \ldots G_n$.

During idle periods, gaming machines $G_1, G_2 \ldots G_n$ preferably display a sequence of attraction messages in sight and sound. The videos may also be used to market specific areas of the casino and may be customized to any informational needs.

Referring to FIG. 11, in electronic video games, central server computer 220 may communicate with at least one video game display element 118, as shown at the left hand side of FIG. 11, and, in time periods during which a gaming machine $G_1, G_2 \ldots G_n$ is not in use, or idle, sequester a portion of video game display element 118 thereof for dedicated display of video attract sequences to attract potential players. Video game display element 118 may be used for display of both the primary and bonus games. Alternatively, as shown at the left hand side of FIG. 11, gaming machines $G_1, G_2 \ldots G_n$ may be provided with a second video display element 122 for displaying video attract sequences and the bonus game.

Where gaming network 210 includes reel type game machines $G_1, G_2 \ldots G_n$, as shown at the right hand side of FIG. 11, central server computer 220 may communicate with at least one active display element 120 so that potential players receive a clear indication of attract sequences and active display element 120 may be used as a video display for the bonus game.

In addition, if gaming machines $G_1, G_2 \ldots G_n$ do not include sound-generating hardware and software for producing attractive sounds orchestrated with the video attract sequences output by each of gaming machines $G_1, G_2 \ldots G_n$, central server computer 220 may include such sound-generating hardware and software. Attractive multimedia video displays and dynamic sounds may be provided by central server computer 220, which employs multimedia extensions to facilitate the display of full-motion video animation, as well as accompanying sound, by gaming machines $G_1, G_2 \ldots G_n$ to attract players thereto.

Furthermore, bonus event computer 240 of gaming network 210 may communicate with central server computer 220 to schedule bonus parameters, such as the type of bonus event, pay tables and gamers that will be involved in play of a particular bonus event. The functions of central server computer 220 and bonus event computer 240 may, of course, be combined in a single computer.

Gaming network 210 may further include a real-time or on-line accounting and gaming information system 260 in communication with central server computer 220. Accounting and gaming information system 260 includes a player database for storing player profiles, a player tracking module for tracking players and a pit, cage and credit system for providing automated casino transactions.

Figure 12:
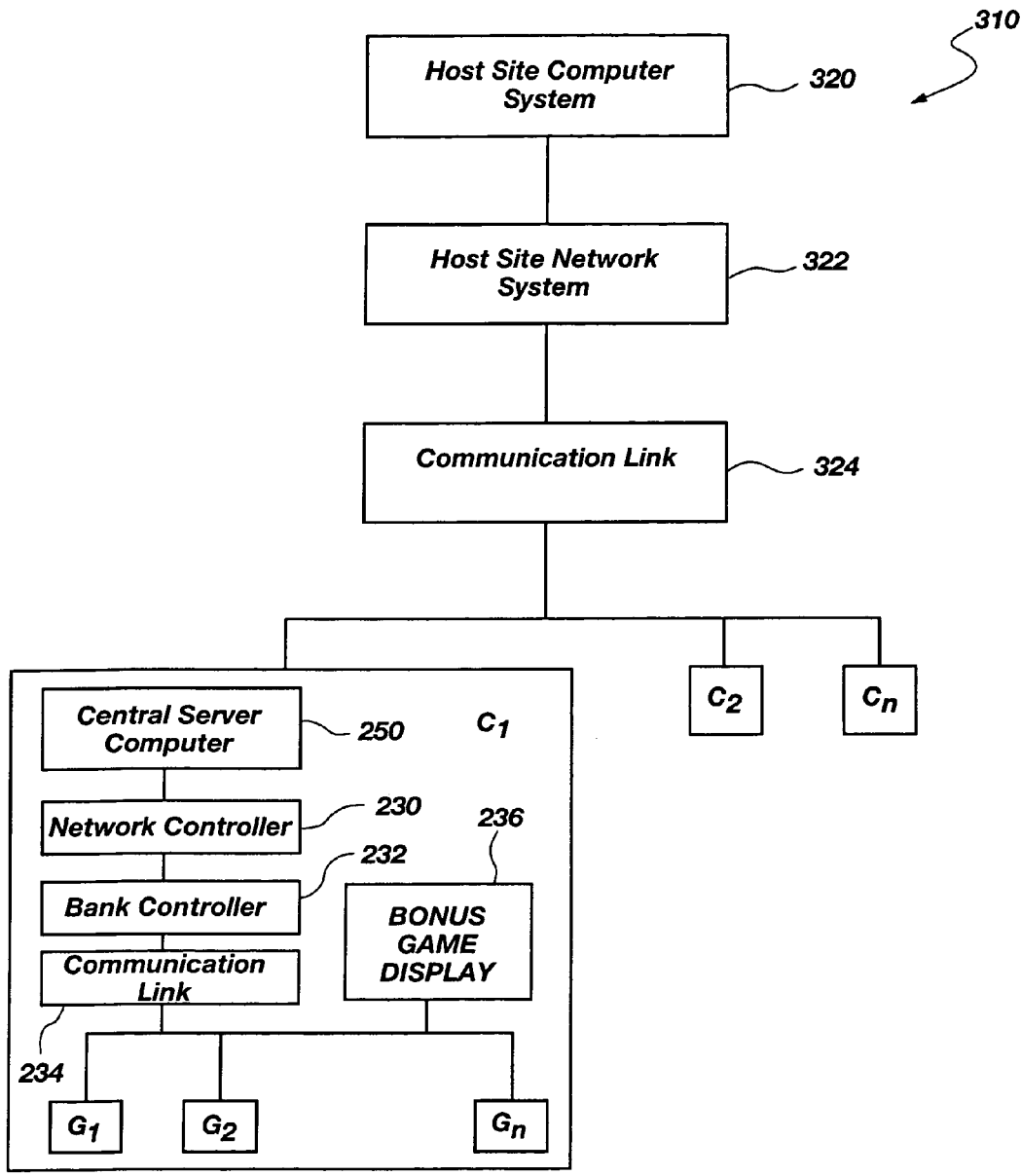
FIG. 12 is a schematic representation of a network including a host site computer and a plurality of central servers in communication therewith.

As previously implied, a bank of gaming machines $G_1, G_2 \ldots G_n$ may be networked together in a progressive configuration, as known in the art, wherein a portion of each wager to initiate a primary game may be allocated to bonus event wards. In addition, and referring to FIG. 12, a host site computer 320 is coupled to a plurality of the central servers 220 at a variety of mutually remote casinos or other gaming sites $C_1, C_2 \ldots C_n$ for providing a multi-site linked progressive automated bonus gaming system 310.

Preferably, host site computer 320 will be maintained for the overall operation and control of system 310. Host site computer 320 includes a computer network 322 and a communication link 324 provided with a high-speed, secure modem link for each individual casino site $C_1, C_2 \ldots C_n$.

Each casino or other gaming site $C_1, C_2 \ldots C_n$ includes a central server computer 220 provided with a network controller 230 which includes a high-speed modem operably coupled thereto. Bidirectional communications between host site computer 320 and each casino site central server 220 is accomplished by the set of modems transferring data over communication link 324.

A network controller 230, a bank controller 232, and a communication link 234 are interposed between each central server 220 and the plurality of networked gaming machines at each casino site $C_1, C_2 \ldots C_n$. In addition, network controller 230, bank controller 232, and communication link 234 may be optionally interposed between each central server 220 and at least one separate display 236 at each casino site $C_1, C_2 \ldots C_n$. However, system 310 may include hardware and software to loop back data for in-machine meter displays to communicate with bonus event award insert areas on gaming machines $G_1, G_2 \ldots G_n$.

Although the foregoing description contains many specifies, these should not be construed as limited the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A gaming system, comprising:
   a primary game; and
   a secondary game of mental strategy, in which a gamer takes a plurality of turns, each turn of said secondary game being awarded upon the occurrence of at least one of a predetermined event in said primary game and a particular result during play of said primary game, wherein, upon receiving a turn in said secondary game, the gamer is permitted to prevent other gamers from taking turns for a specified period of time.

2. The gaming system of claim 1, wherein said secondary game comprises a matrix type game.

3. The gaming system of claim 2, wherein, in said matrix type game, upon positioning at least two first game pieces along a line including at least one second game piece, the gamer captures at least said at least one second game piece.

4. The gaming system of claim 3, wherein, upon said positioning, the gamer also captures said at least two first game pieces.

5. The gaming system of claim 3, wherein said at least one second game piece is captured when said at least two first game pieces are positioned adjacent to and at opposite ends of a single second game piece or a sequence of linearly arranged second game pieces.

6. The gaming system of claim 3, wherein said at least one second game piece is captured when at least three first game pieces are positioned in-line with said at least one second game piece.

7. The gaming system of claim 3, wherein, upon being captured, said at least one second game piece is removed from said matrix.

8. The gaming system of claim 3, wherein, upon being captured, said at least one second game piece becomes a first game piece.

9. The gaming system of claim 3, wherein the gamer is provided with an award for each captured game piece.

10. The gaming system of claim 9, wherein said award associated with each game piece is a fixed amount.

11. The gaming system of claim 9, wherein said award associated with each game piece is an amount that has been wagered on that game piece.

12. The gaming system of claim 9, wherein said award associated with each game piece is based on a result in said primary game that resulted in placement of that game piece.

13. The gaming system of claim 3, wherein, upon said positioning said at least two first game pieces, the gamer has an option to prevent capturing of said at least one second game piece.

14. The gaming system of claim 13, wherein, upon positioning at least one additional first game piece along said line, the gamer recaptures at least each second game piece located along said line.

15. The gaming system of claim 14, wherein, upon recapturing at least each second game piece located along said line, the gamer is provided with an award for each captured game piece and an additional award for previously preventing capture of said at least one second game piece.

16. The gaming system of claim 1, wherein said specified period of time is based on an outcome of said primary game.

* * * * *